(12) United States Patent
Bhatt et al.

(10) Patent No.: US 11,954,944 B2
(45) Date of Patent: Apr. 9, 2024

(54) SYSTEMS FOR AUTHENTICATING USER PERMISSIONS AND METHODS OF USE THEREOF

(71) Applicant: Capital One Services, LLC, McLean, VA (US)

(72) Inventors: Gaurang Bhatt, Herndon, VA (US); Joshua Edwards, Philadelphia, PA (US); Lukiih Cuan, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 548 days.

(21) Appl. No.: 17/235,709

(22) Filed: Apr. 20, 2021

(65) Prior Publication Data

US 2022/0335248 A1    Oct. 20, 2022

(51) Int. Cl.
*G06K 9/00*       (2022.01)
*G06F 18/22*      (2023.01)
(Continued)

(52) U.S. Cl.
CPC .............. *G06V 40/50* (2022.01); *G06F 18/22* (2023.01); *G06F 18/24* (2023.01); *G06N 20/00* (2019.01); *G06Q 20/401* (2013.01); *G06V 20/10* (2022.01)

(58) Field of Classification Search
CPC .......... G06N 20/00; G06N 3/08; G06N 3/084; G06T 2207/20081; G06T 7/11; G06V 20/10; G06V 20/00; G06V 40/172; G06V 40/50; G06F 18/22; G06F 18/24; G06F 21/31; G06F 21/32; G06F 21/30; H04L 63/0861; H04L 63/08; G06Q 20/401
See application file for complete search history.

(56) References Cited

U.S. PATENT DOCUMENTS 8,239,924 B2    8/2012  Ficko et al.
10,432,601 B2*  10/2019 Soon-Shiong .......... G06F 21/10
(Continued)

OTHER PUBLICATIONS

J. Roth, X. Liu and D. Metaxas, "On Continuous User Authentication via Typing Behavior," in IEEE Transactions on Image Processing, vol. 23, No. 10, pp. 4611-4624, Oct. 2014, doi: 10.1109/TIP.2014.2348802. (Year: 2014).*

*Primary Examiner* — Utpal D Shah
*Assistant Examiner* — Kevin M Coomber
(74) *Attorney, Agent, or Firm* — Greenberg Traurig, LLP

(57)    ABSTRACT

Systems and methods of the present disclosure physical object-based passwords by registering an object password including first object representations, first background scene representations, and a first presentation sequence from first image data. Receiving second image data and a second presentation sequence that is a second order in which the user has presented second physical objects to an image acquisition device, and detecting in the second image data second object representations of the second physical objects, and second background scene representations. Computing a probability that the user is a permissioned user by inputting the first image data and the second image data into a machine learning model configured to compute the probability based on comparing the object password and the second image data. Tagging the user as the permissioned user or non-permissioned user based on the probability.

20 Claims, 8 Drawing Sheets

(51) Int. Cl.
  *G06F 18/24* (2023.01)
  *G06N 20/00* (2019.01)
  *G06Q 20/40* (2012.01)
  *G06V 20/10* (2022.01)
  *G06V 40/50* (2022.01)

(56) References Cited

U.S. PATENT DOCUMENTS

| | | | |
|---|---|---|---|
| 10,599,825 B1 | 3/2020 | Benkreira et al. | |
| 10,614,302 B2 | 4/2020 | Withrow et al. | |
| 10,678,898 B2 * | 6/2020 | Hoyos | G06F 21/34 |
| 2017/0357896 A1 * | 12/2017 | Tsatsin | G06N 3/045 |
| 2021/0406351 A1 * | 12/2021 | Son | G06V 40/45 |

* cited by examiner

SYSTEMS FOR AUTHENTICATING USER PERMISSIONS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for authenticating user permissions for operations, including authenticating user permissions using physical object and associated physical surroundings (background) based verification.

BACKGROUND OF TECHNOLOGY

User authentication often requires the use of a password or biometric verification process. However, the use of a password can be unreliable and not secure as users may forget the password, use weak passwords, or may face other obstacles to securing permissions. Similarly, biometrics can be faked or otherwise replicated, and once a biometric security parameter is replicated by another, that biometric parameter is forever compromised. Accordingly, a solution for securing electronic operations by authenticating user permissions according to flexible and secure authentication tests is needed.

SUMMARY OF DESCRIBED SUBJECT MATTER

In some embodiments, the present disclosure provides an exemplary technically improved computer-based method that includes at least the following steps of registering, by a processor of a server associated with an authorizing entity, first image data of a plurality of first images of a plurality of first physical objects to be used for granting permission to a user to perform at least one operation on the server; detecting, by the processor, in the first image data: (i) a plurality of first object representations of the plurality of first physical objects, and (ii) a plurality of first background scene representations of a plurality of first background scenes associated with the plurality of first physical objects; registering, by the processor, a first presentation sequence identifying a first order for presenting each of the plurality of first physical objects for granting the permission to the user to perform the at least one operation on the server; storing, by the processor, in a non-transitory memory: the plurality of first object representations, the plurality of first background scene representations, and the first presentation sequence; receiving, by the processor, over a communication network, a request from the user through a computing device associated with the user to perform the at least one operation, where the computing device includes an image acquisition device; sending, by the processor, in response to the request, a notification to the computing device instructing the user to position a plurality of second physical objects so as to allow the image acquisition device to acquire second image data of a plurality of second images of the plurality of second physical objects; receiving, by the processor, over the communication network, the second image data and a second presentation sequence that is a second order in which the user has presented each of the plurality of second physical objects to the image acquisition device; detecting, by the processor, in the second image data: (i) a plurality of second object representations of the plurality of second physical objects, and (ii) a plurality of second background scene representations of a plurality of second background scenes associated with the plurality of second physical objects; computing, by the processor, a probability that the user is a permissioned user that is permissioned to perform the at least one operation by inputting the first image data and the second image data into at least one machine learning model, where the at least one machine learning model is configured to compute the probability based at least in part on: a first comparison between the plurality of first object representations and the plurality of second object representations, a second comparison between the plurality of first background scene representations and the plurality of second background scene representations, and a third comparison between the first presentation sequence and the second presentation sequence; and tagging, by the processor, the user as: the permissioned user to perform the at least one operation when the probability is above a predefined threshold, or a non-permissioned violator user when the probability is below the predefined threshold.

In some embodiments, the present disclosure provides an exemplary technically improved computer-based system that includes at least the following components of a server, including a non-transitory memory, and at least one processor associated with an authorizing entity. The at least one processor is configured to execute computer code stored in the non-transitory memory that causes the at least one processor to: register first image data of a plurality of first images of a plurality of first physical objects to be used for granting permission to a user to perform at least one operation on the server; detect in the first image data: (i) a plurality of first object representations of the plurality of first physical objects, and (ii) a plurality of first background scene representations of a plurality of first background scenes associated with the plurality of first physical objects; register a first presentation sequence identifying a first order for presenting each of the plurality of first physical objects for granting the permission to the user to perform the at least one operation on the server; store in the non-transitory memory: the plurality of first object representations, the plurality of first background scene representations, and the first presentation sequence; receive over a communication network, a request from the user through a computing device associated with the user to perform the at least one operation, where the computing device includes an image acquisition device; send in response to the request, a notification to the computing device instructing the user to position a plurality of second physical objects so as to allow the image acquisition device to acquire second image data of a plurality of second images of the plurality of second physical objects; receive over the communication network, the second image data and a second presentation sequence that is a second order in which the user has presented each of the plurality of second physical objects to the image acquisition device; detect in the second image data: (i) a plurality of second object representations of the plurality of second physical objects, and (ii) a plurality of second background scene representations of a plurality of second background scenes associated with the plurality of second physical objects; compute a probability that the user is a permissioned user that is permissioned to perform the at least one operation by inputting the first image data and the second image data into at least one machine learning model, where the at least one machine learning model is configured to compute the probability based at least in part on: a first comparison between the plurality of first object representations and the plurality of second object representations, a second comparison between the plurality of first background scene representations and the plurality of second background scene representations, and a third comparison between the first presentation sequence and the second presentation sequence; and tag the user as: the permissioned user to perform the at least one operation when the probability is above a predefined threshold, or a non-permissioned violator user when the probability is below the predefined threshold.

In some embodiments, the present disclosure provides exemplary technically improved computer-based systems and methods that further include at least where the first image data of the plurality of first physical objects includes at least one picture of each of the plurality of first physical objects, at least one video of each of the plurality of first physical objects, or any combination thereof.

In some embodiments, the present disclosure provides exemplary technically improved computer-based systems and methods that further include at least where the second image data of the plurality of second physical objects includes at least one picture of each of the plurality of second physical objects, at least one video of each of the plurality of second physical objects, or any combination thereof.

In some embodiments, the present disclosure provides exemplary technically improved computer-based systems and methods that further include at least where the registering of the first image data includes registering first image data from the plurality of first images taken at different angles for each of the plurality of first physical objects.

In some embodiments, the present disclosure provides exemplary technically improved computer-based systems and methods that further include at least where the receiving of the second image data of the plurality of second images includes receiving second image data of images from the plurality of second images having any combination of each of the plurality of second physical objects.

In some embodiments, the present disclosure provides exemplary technically improved computer-based systems and methods that further include at least where the detecting in the first image data includes detecting in the first image data at least one first image having at least one predefined arrangement of any of the plurality of first physical objects in the at least one first image; and where the computing of the probability is based on a comparison between at least one first object representation of the at least one first image and at least one second object representation of at least one second image from the plurality of second images having the at least one predefined arrangement of any of the plurality of second physical objects in the at least one second image.

In some embodiments, the present disclosure provides exemplary technically improved computer-based systems and methods that further include at least where the detecting in the first image data includes detecting in the first image data at least one first image having a hand of the user holding any of the plurality of first physical objects in the at least one first image; and where the computing of the probability is based on a comparison between at least one first object representation of the at least one first image and at least one second object representation of at least one second image from the plurality of second images having the hand of the user holding any of the plurality of second physical objects in the at least one second image.

In some embodiments, the present disclosure provides exemplary technically improved computer-based systems and methods that further include at least where the at least one machine learning model is an image classification machine learning model.

In some embodiments, the present disclosure provides exemplary technically improved computer-based systems and methods that further include at least where the authorizing entity is a financial institution.

In some embodiments, the present disclosure provides exemplary technically improved computer-based systems and methods that further include at least where the at least one operation is a financial transaction.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
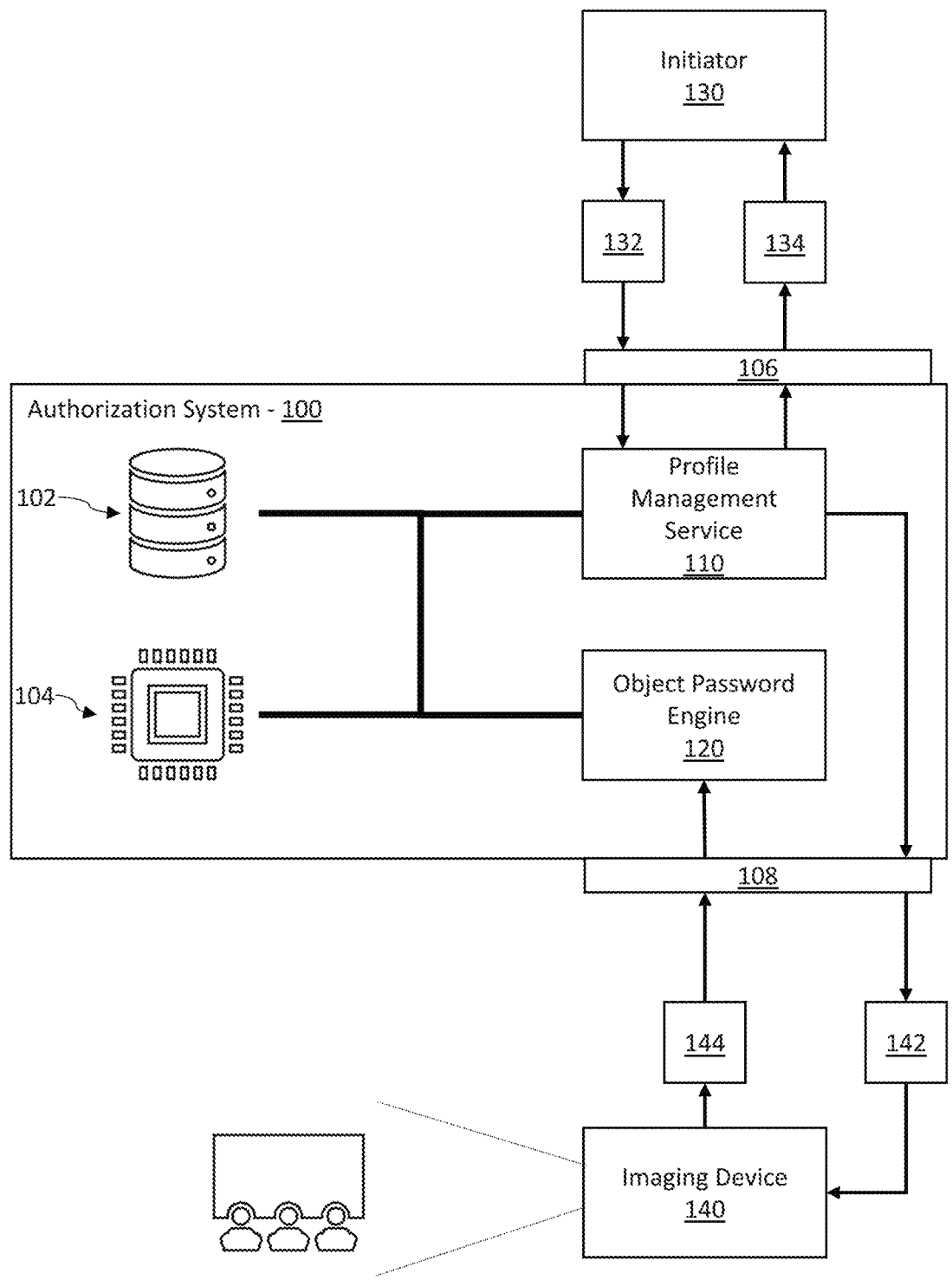
FIGS. 1-8 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of user permissions authentication according to the detection of specified physical objects and physical scenes. The following embodiments provide technical solutions and technical improvements that overcome technical problems, drawbacks and/or deficiencies in the technical fields involving electronic operation permissions authentication via user-supplied credentials. As explained in more detail, below, technical solutions and technical improvements herein include aspects of improved image-based credentials that employs object detection and object recognition to match physical objects and a background scene of an image to user-specified physical objects and background scenes, thus requiring user possession and presentation of the physical objects as well as a user location at the background scene to provide multiple physical parameters for securing permissions for the electronic operations. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of an exemplary computer-based system and platform for physical object-based authorization in accordance with one or more embodiments of the present disclosure.

In some embodiments, an authorization system 100 is provided to manage authorization of operations at an initiator 130 via user authentication with object passwords using physical objects imaged with an imaging device 140. In some embodiments, the initiator 130 may submit an access request 132 to the authorization system 100 to request authorization to perform the operation. The authorization system 100 may utilize computer processing components associated with an authorizing entity, such as a processor 104 and a data store 102 to request or otherwise receive a user response with an access control 144 according to a user authentication with a physical object.

In some embodiments, the initiator 130 may include any computing device from which user profile-related operations are performed or executed, such as, e.g., a terminal, personal computer or mobile computing device for performing Internet-based and application-based activities (e.g., account logins, account information changes, online purchases, instant message communications, social media posts, among others and combinations thereof).

In some embodiments, the initiator 130 may include a physical terminal for performing electronic operations, such as, e.g., a point-of-sale device, automated teller machine (ATM) or other device. As a result of a user executing operations via the initiator 130, data entries may be produced for entry into the user's account. For example, the initiator 130 may produce an access request 132 to perform the operation relative to the user profile of the user.

In some embodiments, the operation may include, e.g., any user profile-related action that is authorized via electronic authentication with user profile credentials. For example, the operation may include, e.g., an electronic activity relative to the user profile, such as electronic transactions, electronic or internet-based messaging, text messaging (e.g., simple message service (SMS), multimedia message service (MMS), rich communication service (RCS), etc.), data transfers (e.g., between cloud accounts, between encrypted folders, file downloads, file uploads, etc.), or any other electronic activity authorized with a user profile authentication. In some embodiments, the operation may include a physical activity authorized via electronic authentication and authorization, such as, e.g., electronically controlled locks, doors, etc. for authorizing access to a physical space (e.g., building, house, room, apartment, condominium, office, lock box, safe deposit box, locker, etc.).

In some embodiments, the access request 132 may include attributes related to the operation, the user associated with the operation, and/or the initiator 130. In some embodiments, the access request 132 may include, e.g., a user identifier associated with the operation, a user profile associated with the operation, a third-party entity identifier associated with the operation (e.g., an operator of the initiator 130), an operation type identifier, an operation value or operation quantity, a time data item, a location data item, a date data item, a device type or device identifier associated with the initiator 130, an operation description, or other attributes representing characteristics of the operation.

For example, in some embodiments, the access request 132 may include a transaction-related activity, such as a transaction record (e.g., transaction authorization request, posted transaction, etc.). In such an example, the data items may include, e.g., a transaction value, a transaction type, an account identifier or a user identifier or both, a merchant identifier, a transaction authorization date, a transaction post date, a transaction location, an execution device (e.g., point-of-sale device, Internet payment, etc.) among other transaction data and combinations thereof.

In some embodiments, the access request 132 may include, e.g., a communication to the authorization system 100 via a communication interface 106 such as, e.g., a suitable application programming interface (API), messaging protocol, or other communication technology. In some embodiments, the access request 132 may be communicated across, e.g., a direct interface between the initiator 130 and the authorization system 100 or across a network (such as a local area network (LAN), wide area network (WAN), Internet, intranet, or other network and combinations thereof), or a combination thereof. In some embodiments, the communication interface 106 may include, e.g., hard wired connections (e.g., fiber optic cabling, coaxial cabling, copper wire cabling, ethernet, etc.), wireless connections (e.g., WiFi, Bluetooth, Zigbee, Z-Wave, cellular networking such as 5G, 4G, Long Term Evolution (LTE), 3G, High-Speed Downlink Packet Access (HSPA), Global System for Mobile Communications (GSM), Code-division multiple access (CDMA) or other technologies, and combinations thereof), or combination thereof.

In some embodiments, authorization system 100, the initiator 130, the imaging device 140, and any other computing devices are configured to operate in the distributed network environment, communicating with one another over one or more communication interfaces 106 and 108 over suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below.

In some embodiments, the API refers to a computing interface that defines interactions between multiple software intermediaries. An API defines the kinds of calls or requests that can be made, how to make the calls, the data formats that should be used, the conventions to follow, among other requirements and constraints. An API can be entirely custom, specific to a component, or designed based on an industry-standard to ensure interoperability to enable modular programming through information hiding, allowing users to use the interface independently of the implementation.

In some embodiments, the imaging device 140 may communicate the access control 144 via a communication interface 108 that may be the same as or different from the communication interface 106. Similar to the communication interface 106, the communication interface 108 may include, e.g., any suitable communication technology over any suitable connection (e.g., wired, wireless, direct, network, etc.), using any suitable communication methodology (e.g., API, messaging protocol, transfer protocol, etc.).

In some embodiments, the authorization system 100 include functions and components configured for registering physical objects via digital imagery for use as a user's object password. The physical object may be linked to the user's profile for use as an authentication credential upon the access request 132 from the initiator 130.

In some embodiments, the authorization system 100 may include hardware and software components including, e.g., a user computing device, server, server system, database management system, cloud platform, mainframe or a combination thereof and hardware and software associated therewith. In some embodiments, the authorization system 100 may include hardware components such as a processor 104, which may include local or remote processing components. In some embodiments, the processor 104 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 104 may include data-processing capacity provided by the microprocessor. In some embodiments, the microprocessor may include memory, processing, interface resources, controllers, and counters. In some embodiments, the microprocessor may also include one or more programs stored in non-transitory memory.

Similarly, the authorization system 100 may include data store 102, such as local hard-drive, solid-state drive, flash drive, database or other local storage, or remote storage such as a server, mainframe, database or cloud provided storage solution. In some embodiments, the term "database" refers to an organized collection of data, stored, accessed or both electronically from a computer system. The database may include a database model formed by one or more formal design and modeling techniques. The database model may include, e.g., a navigational database, a hierarchical database, a network database, a graph database, an object database, a relational database, an object-relational database, an entity—relationship database, an enhanced entity— relationship database, a document database, an entity—attribute—value database, a star schema database, or any other suitable database model and combinations thereof. For example, the database may include database technology such as, e.g., a centralized or distributed database, cloud storage platform, decentralized system, server or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

Depending on the database model, one or more database query languages may be employed to retrieve data from the database. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages.

The database may include one or more software, one or more hardware, or a combination of one or more software and one or more hardware components forming a database management system (DBMS) that interacts with users, applications, and the database itself to capture and analyze the data. The DBMS software additionally encompasses the core facilities provided to administer the database. The combination of the database, the DBMS and the associated applications may be referred to as a "database system".

In some embodiments, the authorization system 100 may implement computer engines for profile management of each user registered with the authorization system 100, and registration and authentication of object passwords for authorization decisions for operations at the initiator 130. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, upon initiating the operation at the initiator 130, the initiator 130 may produce the access request 132. The initiator 130 may communicate the access request 132 to the authorization system 100 via the communication interface 106 to request access to a user profile associated with the user for performing the operation. In some embodiments, the access to the user profile for the operation may require authentication and authorization via security credentials associated with the user profile. Accordingly, in some embodiments, a profile management service 110 may identify the user profile associated with the access request 132, e.g., according to user profiles stored in the data store 102 or in any other data storage or any combination thereof.

In some embodiments, the profile management service 110 may include dedicated and/or shared software components, hardware components, or a combination thereof. For example, the profile management service 110 may include a dedicated processor and storage, may share hardware resources, including the processor 104 and data store 102 of the authorization system 100 via, e.g., a bus or other interface, or any combination thereof.

In some embodiments, the profile management service 110 may query or otherwise access the user profile associated with the access request 132 and determine access requirements associated with performing the operation with access to the user profile. In some embodiments, the access requirements may include, e.g., security credentials (e.g., encryption keys, password, personal identification number (PIN), security questions, multi-factor authentication, etc.), identity requirements (profile username, user image, personally identifiable information (e.g., social security number, date of birth, address, etc.), or any other access requirement or any combination thereof. In some embodiments, the access requirements include an object password requirements according to a registered object password registered for the user profile.

In some embodiments, an object password may include, e.g., one or more images of the user, of a location, of an object, of multiple objects, of a sequence of objects, or any combination thereof. For example, in some embodiments, the object password may include a requirement for an image having the user and a particular physical object captured in the image. In some embodiments, the requirement may include an image having the user and multiple particular physical objects. In some embodiments, the requirement may include an image having the user and one or multiple particular physical objects situated in defined positions within the image. In some embodiments, the requirement may include an image having the user and one or multiple particular physical objects is a particular location or setting. In some embodiments, the requirement may include a sequence of images having the user and multiple particular physical objects presented in an order across the sequence of images (e.g., in a video or other time-dependent sequence of images with sequentially presented particular physical objects). In some embodiments, the requirement may include a sequence of images having the user and a particular physical object presented in a sequence of positions (e.g., in a video or other time-dependent sequence of images with a sequentially repositioned particular physical object). Accordingly, in some embodiments, the object password of the user profile may include requirements for the presentation in one or more images of, e.g., the user, one or more physical objects, one or more physical object positions, one or more physical object sequences (e.g., time-dependent or order-dependent sequences), one or more physical object positioning sequences (e.g., time-dependent or order-dependent sequences), one or more image locations, or any combination thereof.

In some embodiments, the profile management service 110 may determine the object password requirements based on the user profile access requirements and generate a notification 142 to the user to request an access control 144 including the object password. In some embodiments, the notification may include, e.g., any suitable data communication, e.g., via the communication interface 108 and/or the communication interface 106 to a computing device associated with the user. In some embodiments, the computing device may include the imaging device 140 as shown in FIG. 1. However, in some embodiments, the computing device may include the initiator 130, a separate user computing device, the imaging device 140, or any combination of the initiator 130, the imaging device 140 and the separate user computing device.

In some embodiments, the user may respond to the notification by providing the object password according to the access requirements for the user profile. In some embodiments, the user may employ the imaging device 140 and/or the user computing device to provide the object password with the access control 144 to the authorization system 100.

In some embodiments, the imaging device 140 may capture an image of a scene, including foreground objects, such as the user, one or more particular physical objects, etc., and background objects, such as, e.g., a background scene including stationary objects, landscape, colors, lighting, etc. In some embodiments, imaging device 140 may capture a single image, a sequence of images, a video, or any combination thereof. For example, in some embodiments, a software application associated with the authorization system 100 may control the imaging device 140 to capture imagery according to, e.g., a default image capture setting, image capture settings determined from the notification 142, or according to any other suitable method or any combination thereof.

In some embodiments, to present the object password, the user may present one or more physical objects according to a predetermined sequence, in predetermined positions, in front of a particular background scene (e.g., including permanent and/or temporary objects and features of the scene) and/or according to any other object password parameters. In some embodiments, for example, the user may present to the imaging device 140 a plurality of physical objects, where presentation includes an ordered sequence of each physical object of the plurality of physical objects in a specified ordered sequence of positions. Moreover, for example, the scene may include a particular room, furniture, view, or other background scene.

In some embodiments, the plurality of physical objects and the background scene may be captured by the imaging device 140 using, e.g., a sequence of still images, a video or any combination of still imagery and video. In some embodiments, the software application associated with the authorization system 100 may provide prompts to the user regarding the framing of the imaging device 140, cues to make presentations of the physical objects, and other directions for when and where to provide the object password. As a result, in some embodiments, the sequence of each physical object in the plurality of physical objects and/or sequence of positions of each physical object of the plurality of objects may be captured by a separate image or frame in a sequence of images or frames captured by the imaging device 140.

In some embodiments, the imaging device 140 may communicate the object password presented by the user to the authorization system 100 as an access control 144 message, e.g., via the communication interface 108. In some embodiments, an object password engine 120 may ingest the access control 144 to detect the user, physical objects and background scene in each image of the object password. In some embodiments, the object password engine 120 may include dedicated and/or shared software components, hardware components, or a combination thereof. For example, the object password engine 120 may include a dedicated processor and storage, may share hardware resources, including the processor 104 and data store 102 of the authorization system 100 via, e.g., a bus or other interface, or any combination thereof.

In some embodiments, the object password engine 120 may include, e.g., one or more machine learning models to automatically detect physical objects and other items in each image of the object password in the access control 144 and recognize one or more of the detected physical objects, user and/or background scene. In some embodiments, the object password engine 120 may utilize one machine learning model to detect physical objects, the user and the background scene, a separate machine learning model to detect each of the physical objects, the user and the background scene, or a combination of machine learning models to detect various aspects of the object password in the access control 144. In some embodiments, another machine learning model may be used to recognize or otherwise match the detected physical objects, the user and/or the background scene to registered physical objects, user and/or background scene for the use profile credentials. In some embodiments, any other suitable algorithm or mechanism for matching the detected physical objects, user and/or background scene to the registered object password may be employed.

In some embodiments, the object password engine 120 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
 i) define Neural Network architecture/model,
 ii) transfer the input data to the exemplary neural network model,
 iii) train the exemplary model incrementally,
 iv) determine the accuracy for a specific number of timesteps,
 v) apply the exemplary trained model to process the newly-received input data,
 vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the object password may be registered as a credential for the user profile using a registration process. In some embodiments, the registration process may include the software application associated with the authorization system 100 providing a prompt to the user to capture an image, sequence of images, video or any combination thereof while presenting one or more physical objects in one or more positions relative to a background scene as described above. As a result, similar to above, the imaging device 140 may capture an image or sequence of images and/or frames to capture the one or more physical objects in one or more positions relative to a background scene.

In some embodiments, the software application may cause the imaging device 140 and/or the user computing device to provide the images to the authorization system 100, e.g., via the communication interface 108. In some embodiments, the object password engine 120 may include, e.g., one or more machine learning models to automatically detect the physical objects and background scene in each image and recognize one or more of the detected physical objects, user and/or background scene.

In some embodiments, upon detecting and recognizing one or more physical objects and positions thereof, the user and the background scene of each image and/or frame, the object password engine 120 may record the one or more physical objects and positions thereof, the user and the background scene and sequences thereof as an object password. In some embodiments, the object password engine 120 may communicate the object password to the profile management service 110 to register the object password with the user profile as an authentication credential to authenticate access controls during authorization of operations related to the user profile.

Accordingly, in some embodiments, upon receiving the access control 144 and detecting and recognizing the physical objects, the user and the background scene presented therein, the object password engine 120 may determine whether a match exists to the object password registered for the user profile. In some embodiments, to compare the access control 144 to the registered object password, the object password engine 120 may reference the user profile. For example, the access control 144 may be in response to the notification 142. Accordingly, the access control 144 may include metadata identifying details of the notification 142, such as, e.g., the user to which the notification 142 was sent, the access request 132 that triggered the notification 142 or an operation identifier associated with access request 132, a message identifier identifying the notification and/or the access control 144, among other details or any combination thereof. In some embodiments, the access control 144 may include attributes from the software application and/or the imaging device 140, such as, e.g., a device identifier, a user identifier, a user profile identifier, an operation identifier associated with access request 132, or any other suitable attribute or any combination thereof.

In some embodiments, the access control 144 may also include, e.g., a user selection for a response to the access request 132. For example, the user may select to authorize or deny the access request 132 based on whether the user has knowledge of and/or approves of the operation at the initiator 130. Accordingly, in some embodiments, where the access control 144 includes an object password matching the registered object password for the user profile, the profile management service 110 may authorize or deny the operation of the access request based on the user selection.

In some embodiments, where the object password presented in the access control 144 fails to match the registered object password for the user profile, the profile management service 110 may automatically reissue the notification 142. In some embodiments, the profile management service 110 may resend the notification 142 up to a limited number of times to provide the user the opportunity to provide the correct object password. In some embodiments, the limited number of times may include, e.g., two times, three times, five times, or other suitable number of times.

In some embodiments, the number of times the profile management service 110 may reissue the notification 142 may depend on what feature(s) of the object password of the access control 144 failed to match the registered object password and/or to what extent the object password differed from the registered object password. For example, where the image of the user matched the user in the registered object password but one or more physical objects and/or one or more positions and/or an order thereof failed to match, then the profile management service 110 may provide the notification 142 up to, e.g., three, five, ten, or other suitable number of times. However, in some embodiments, where the user and/or the background scene fails to match, the profile management service 110 may provide the notification 142, e.g., no additional times, once, twice, or three times or other suitable number of times. In some embodiments, as a difference between the sequence of physical objects and/or positions of the object password and the sequence of physical objects and/or positions of the registered password increases, the profile management service 110 may provide the notification 142 fewer times. The number of times the profile management service 110 may reissue the notification 142 may vary algorithmically or based on a predefined table based on the difference of the sequence, e.g., according to an algorithm and/or look-up-table stored in the data store 102.

In some embodiments, where the access control 144 fails to match the registered object password for the limited number of times, the profile management service 110 may automatically determine to deny the operation of the access request 132.

In some embodiments, based on the access control 144, the profile management service 110 may issue an access decision 134 to the initiator 130 to provide access approval or access denial to the user profile for the operation. In some embodiments, where the access control 144 is authenticated (e.g., the object password matches the registered object password for the user profile), the access decision 134 may include the authorization or denial selected by the user. However, in some embodiments, where the access control 144 is unauthenticated (e.g., the object password fails to match the registered object password for the user profile), the access control 144 may include an access denial denying access of the operation to the user profile. Accordingly, a user may securely and efficiently initiate and authorize operations at the initiator 130 using more secure credentials that are more difficult to comprises, thus improving the security of operations.

Figure 2:
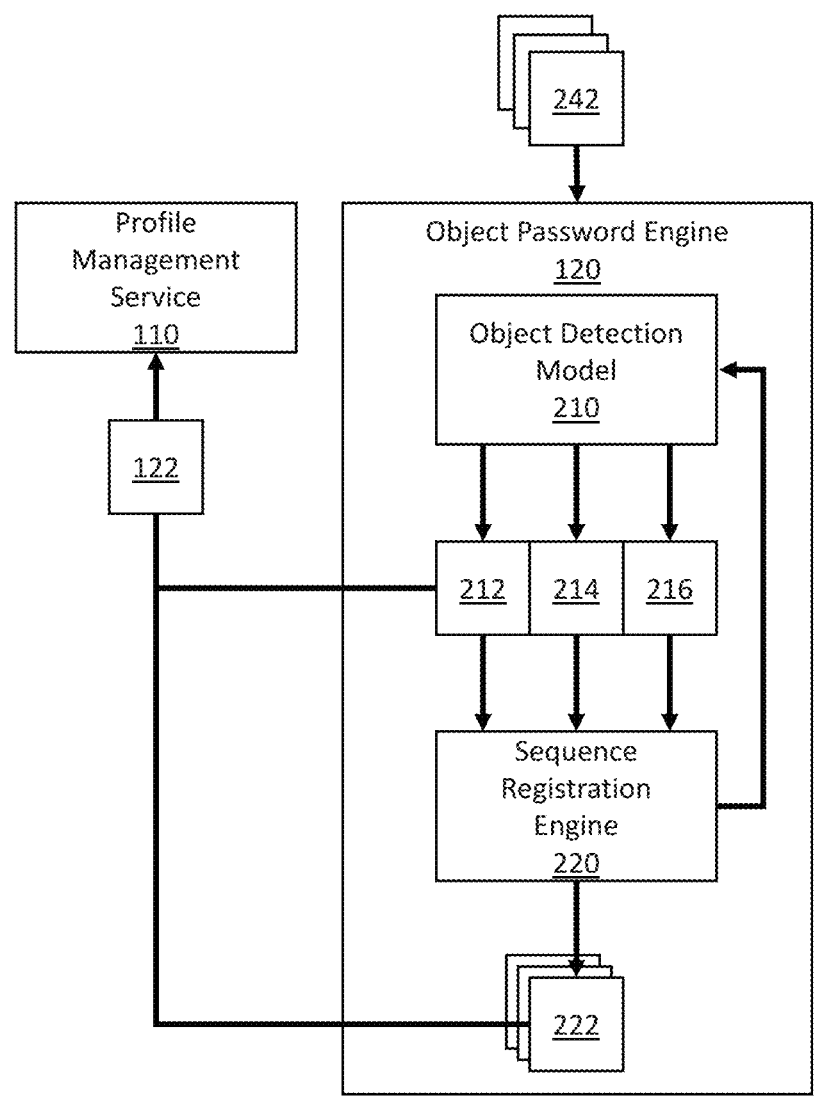

FIG. 2 is a block diagram of an exemplary object password engine of an authorization system for physical object-based authorization in accordance with one or more embodiments of the present disclosure.

In some embodiments, the object password engine 120 of the authorization system 100 may be used to register object passwords for a user profile. In some embodiments, response to a user selecting, e.g., via a user computing device such as a smartphone, tablet, laptop computer, desktop computer, or other device in communication with the authorization system 100, the object password engine 120 may initiate an object password registration process for use in authorizing operations with an authorizing entity.

In some embodiments, the authorizing entity may include and central or distributed authority for authorizing operations. In some embodiments, the operations may include, e.g., internet-based messaging (e.g., email or instant messaging), social media posts, cloud storage uploads and download, network location access and file modifications, financial transactions (e.g., payments, deposits, withdrawal, etc.), account access attempts (e.g., financial account access, social media account access, email account access, streaming media account access, etc.), or any other operation performed using computing devices and computing systems or any combination thereof. For example, the operations may include financial transactions at an initiating device such as a point-of-sale terminal, automated teller machine (ATM), via a payment application or online payment framework, or any other suitable electronic payment mechanism. Thus, the authorizing entity may include a financial institution, such as bank, credit union, hedge fund, financial management firm, digital payments application, broker, lender, or any other financial institution or any combination thereof.

In some embodiments, to control access to a user profile for authorizing operations, the user may set an object password for the user profile. To do so, in some embodiments, the user may provide a set of credentials to the object password engine 120. The credentials may include, e.g., a user identity (e.g., login name, email address, legal name, phone number, etc.) and image data for the object password registration. In some embodiments, the object password engine 120 may utilize the user identity to reference the associated user profile in the profile management service 110 and initiate the registration process for the user profile to modify the user profile for access control via an object password registered using the image data.

In some embodiments, the image data may include images 242 received, e.g., from the imaging device 140 described above. The object password engine 120 uses the images 242 to detect, extract and register the image data represented therein as the object password for the user profile. Thus, in some embodiments, the user may provide images 242 that include a selected unique arrangement of physical objects in a view of the imaging device and set against a particular background scene.

In some embodiments, the images 242 can include multiple images in a sequence according to an order of capture. For example, the images 242 may include a video feed with each successive frame of the video feed being a next image in a sequence. The images 242 may be a sequence of still images where the order of still images form the sequence. Thus, the sequence can be defined by the order of the images, or by the time of capture of each image (e.g., relative to a time of day, or relative to a timer initiated with a capture of the first image in the sequence), or any other technique for defining an order of a sequence of images or frames.

In some embodiments, the arrangement of the physical objects in the images 242 may include an order of presentation in the sequence of the images 242. The user may present multiple physical objects including portable objects, each in one or more positions, in a particular order. Thus, the sequence of the images 242 may capture an order of physical object and position variations. For example, a first physical object may appear in a first position in a first image, then the first physical object may appear in a second position in a subsequent image, and then a second physical object may appear in a third position in another subsequent image, and then the first physical object may appear in a fourth position in another subsequent image, where each position of the first position, the second position, the third position and the fourth position may be distinct positions within the images 242, or may include repeated positions within the images 242 (e.g., the first position being the same as the third position). In some embodiments, any order of variations of physical objects presenting in the images 242 and positions of the physical objects within the images 242 may constitute the arrangement of physical objects for use as an object password.

In some embodiments, the user may identify the physical objects and associated positions as defined for use in the object password by placing the physical objects according to a predefined marker. In some embodiments, the marker for a physical object may include the user's hand such that any object that the user holds while capturing the images 242 may be included in the physical objects for the object password. In some embodiments, the marker may include a gesture performed by the user, such as the user pointing at the physical object or other suitable gesture. In some embodiments, the marker may include an identifiable marking on or adjacent to the physical objects, such as, e.g., an arrow pointing at each physical object, an "X" or other symbol positioned or formed on each physical object, a digital marker added to the images 242 after capture of the physical objects to tag each physical object of the object password (e.g., attaching a digital label, framing in a digital shape such as a box, or other digital marker), or any other suitable marker or any combination thereof.

In some embodiments, the arrangement of physical objects may be set against a background scene defined by user selection. For example, the user may perform the arrangement of physical objects against the background scene of the user's particular office space, a particular wall of a room, a particular window, or any other background scene. In some embodiments, the background scene may include any physical objects, stationary objects, colors, patterns, shapes, textures, etc. that may appear in the background scene (e.g., a landscape visible through a window, a poster or picture on a wall, a plant in the room or office space, etc.).

In some embodiments, the images 242, whether still images, video frames, or a combination thereof, are ingested by an object detection model 210 of the object password engine 120. In some embodiments, the object detection model 210 analyzes each image of the images 242 to detect the physical objects, the background scene, the user among any other objects represented in the images 242. In some embodiments, the object detection model 210 may include a first layer of object password detection including any suitable object detection framework for identifying and classifying objects. Upon detection according to the first layer, identified and classified objects may be processed according to a second layer of object password detection including determining a position within each image of each identified and classified object.

In some embodiments, the first layer of the object detection framework may employ a non-neural network based approach. In such an approach, the object detection model 210 may include a feature detection model and a classifier model where the feature detection model processes each image to form features based on variations in color, contrast, luminance, or other image data. For example, a Viola-Jones algorithm may be employed to detection, e.g., rectangle features, Haar features, or other features in each image. Other object detection frameworks, such as, e.g., scale-invariant feature transform (SIFT), histogram or oriented gradients (HOG), or other key-point based and gradient based feature detection techniques may be employed or any combination thereof. In some embodiments, upon feature detection, the object detection model 210 may employ the classifier model trained to recognize combinations of features and feature positioning/orientation to classifier objects made of up of sets of features. For example, the classifier model may include, e.g., a support vector machine, decisions trees, random forests, learning vector quantization, Naïve Bayes classifier, or other suitable classification algorithm based on the detected features.

In some embodiments, the object detection framework may employ a neural network based approach to object detection. In such an approach, the object detection model 210 may use a neural network, such as a suitable convolutional neural network architecture of object detection and/or recognition, to ingest each image and output object labels for each image identifying the object. In some embodiments, the labels may include, e.g., a descriptor identifying the object, such as, e.g., a cup, a plant, hand, etc. However, in some embodiments, the neural network may simply label each detected object according to a unique identifier, such as, e.g., object 1, object 2, etc.

In some embodiments, the neural network may include any suitable neural network architecture, such as, e.g., Region Proposals (R-CNN, Fast R-CNN, Faster R-CNN, cascade R-CNN), Single Shot MultiBox Detector (SSD), You Only Look Once (YOLO), Single-Shot Refinement Neural Network for Object Detection (RefineDet), Retina-Net, Deformable convolutional networks or any other neural network architecture or any combination thereof. In some embodiments, the neural network may be trained to detect objects based on supervised or semi-supervises training using a training dataset of annotated images. Accordingly, each image in the training dataset may be input into the neural network, and the label produced by the neural network may be compared to the annotations of the annotated images to determine an error. For example, the neural network may employ a suitable loss function to determine the error between the predicted label and the annotation of each image. For example, the loss function may include, e.g., cross entropy loss, or other suitable loss function. The error may then be backpropagated to neurons of the neural network to update the weights thereof and train the neural network to more accurately recognize objects associated with the annotations of each image in the training dataset.

Accordingly, in some embodiments, the object detection model 210 may use the object detection framework to label each object detected in the images 242. In some embodiments, the label may include an identification of the object. Thus, the representation of the physical objects in combination with the label may form an object representation 212 for each object. In some embodiments, additionally or alternatively, the object detection framework may employ an algorithm to fingerprint each object for quick and efficient comparison to representations in later images. For example, in some embodiments, the algorithm may determine one or more values to characterize relative positions, sizes, and/or shapes of portions of each detected object. In some embodiments, the one or more values may be aggregated for each physical object to form an object representation 212 including a feature vector or feature map characterizing each physical object. As a result, later images may be compared to the object representation 212 such that physical objects represented in the later images may be matched to the object representation 212 of each image 242 to authenticate an object password.

In some embodiments, the object detection model 210 may also include a facial recognition model or other suitable model for identifying a person. In some embodiments, the facial recognition model may identify within the images 242 a face or other identifying portion of the user. Using the facial recognition model, the object detection model 210 may generate a digital map for the identified face or other identifying portion. For example, in some embodiments, the facial recognition model may include, e.g., a geometric or photo-metric algorithm to represent the user's face according to relative position, size and/or shape of one or more portions of the face (e.g., the eyes, nose, ears, mouth, lips, cheekbones, chin, jaw, etc.), or other facial morphology representation or any combination thereof to form a user representation 216 representing the user in the images 242. In some embodiments, the representation of the user's face may include, e.g., a feature vector or feature map specifying the relative position, size and/or shape of one or more portions of the face, a score representing a combination of the relative position, size and/or shape of one or more portions of the face, or any combination thereof. Thus, the user's face or other identifying portion may be registered with the user's profile in the profile management service 110 to compare against authorization requests using an object password to authenticate operations relative to the user profile.

In some embodiments, using a neural network-based or non-neural network-based object detection framework, the object detection model 210 may automatically label each detected object in each image of the images 242. In some embodiments, the object detection model 210 may be trained to recognize physical objects, backgrounds, scenes, structures, faces, body parts (e.g., arms and/or hands and/or fingers) among other objects. Thus, the physical objects, including any portable objects presented by the user and any portable or stationary objects apart of the background scene may be automatically recognized and labeled by the object detection model 210.

In some embodiments, the first layer of the object detection model 210 may output, for each image of the images 242, object representations 212 for the detected physical objects presented by the user in each image, a background representation 214 for the detected background scene, and a user representation 216 for the detected user. In some embodiments, the object representations 212 may include any object representation in each image recognized by the object detection model 210, any object representation accompanies by the marker, or according to any other suitable criteria. For example, in some embodiments, the object detection model 210 may be configured to detect all physical objects in the image for which the object detection model 210 has been trained to recognize and select one or more physical objects indicated by the marker.

In some embodiments, the second layer of the object detection model 210 may determine and output a position of each detected object of each image, including the position of each of the object representations 212, the background representation 214, and the user representation 216 for each image. In some embodiments, the object detection model 210 may identify a position of each physical object with a given image based on, e.g., pixel measurements of distance from one or more edges (e.g., from a bottom edge, from a top edge, from a left edge, from a right edge) or combination of two more distances from two or more edges. In some embodiments, using the position within a given image, a relative position, or arrangement of each physical object may be determined based on, e.g., distance and direction between any two physical objects in the given image. However, other forms of determining and representing relative spacing and orientation of physical objects within the given image may be employ, such as distance, direction and orientation relative to fixed object, relative to the marker, relative to the user, one a pixel scale, on a percent (e.g., of distance across the image) scale, or using any other reference point and/or scale or any combination thereof.

In some embodiments, the arrangement of the physical objects, the background scene, the user and any other identified items in each image may be attached to image data representing the object representations 212, the background representation 214, and the user representation 216, respectively. As a result, the object detection model 210 may identify image data for each image including the physical objects, the background scene and the user and an arrangement thereof.

In some embodiments, the image data may be provided to a sequence registration engine 220. As described above, the object password may include a sequence of presentations, presentation sequence 222, of physical objects in the images 242 at positions within each image. In some embodiments, the sequence registration engine 220 sequentially or in a batch receives the image data, including the object representations 212, the background representation 214, and the user representation 216 with each respective arrangement in each image.

In some embodiments, based on the order of the images 242 (e.g., according to a time stamp, predefined order, count, or other ordering mechanism, e.g., represented in metadata or an additional file or other technique), the sequence registration engine 220 may identify a sequence of physical objects as a first object password factor, a sequence of positions and/or arrangements for each physical object as a second object password factor, among other sequences as additional object password factors. In some embodiments, the ordered sequence of physical objects and arrangements defines the presentation sequence 222. Thus, images having a matching presentation sequence with object representations matching the physical objects according to the sequence of the object representations 212 with the sequence of arrangements thereof in front of a background scene matching the background representation 214 with a user matching the user representation 216 may satisfy all factors of the object password to, e.g., authenticate access or permission to perform an operation, such as a financial transaction or other electronic operation.

In some embodiments, to improve accuracy and reliability for detection of the physical objects upon requesting authorization with a later set of images, the object password engine 120 may instruct the user to resubmit images of the physical objects, arrangements thereof and background scene multiple times. Each time the user resubmits the images of the physical objects, arrangements thereof and background scene, the physical objects may include multiple different angles such that a different view of each physical object is provided. As a result, the object password engine 120 may register object representations 212 that represent the physical objects from any side, angle, surface, face or other view of each physical object.

In some embodiments, the object representations 212, the background representation 214, and the user representation 216 and the presentation sequence 222 may be registered with the profile management service 110. In some embodiments, the profile management service 110 may include a user profile associated with the user for the object password. In some embodiments, the profile management service 110 may control access to the user profile, e.g., for operations relative to the user profile, using a set of permissions. In some embodiments, to authorize operations for the user profile, a request may include an object password as credentials to trigger one or more permissions from the set of permissions. Thus, in some embodiments, the object password engine 120 may provide the object representations 212, the background representation 214, and the user representation 216 and the presentation sequence 222 to the profile management service 110 for registration as the object password 122 such that the object password submitted with the request may be compared according to each factor for authorization.

Figure 3:
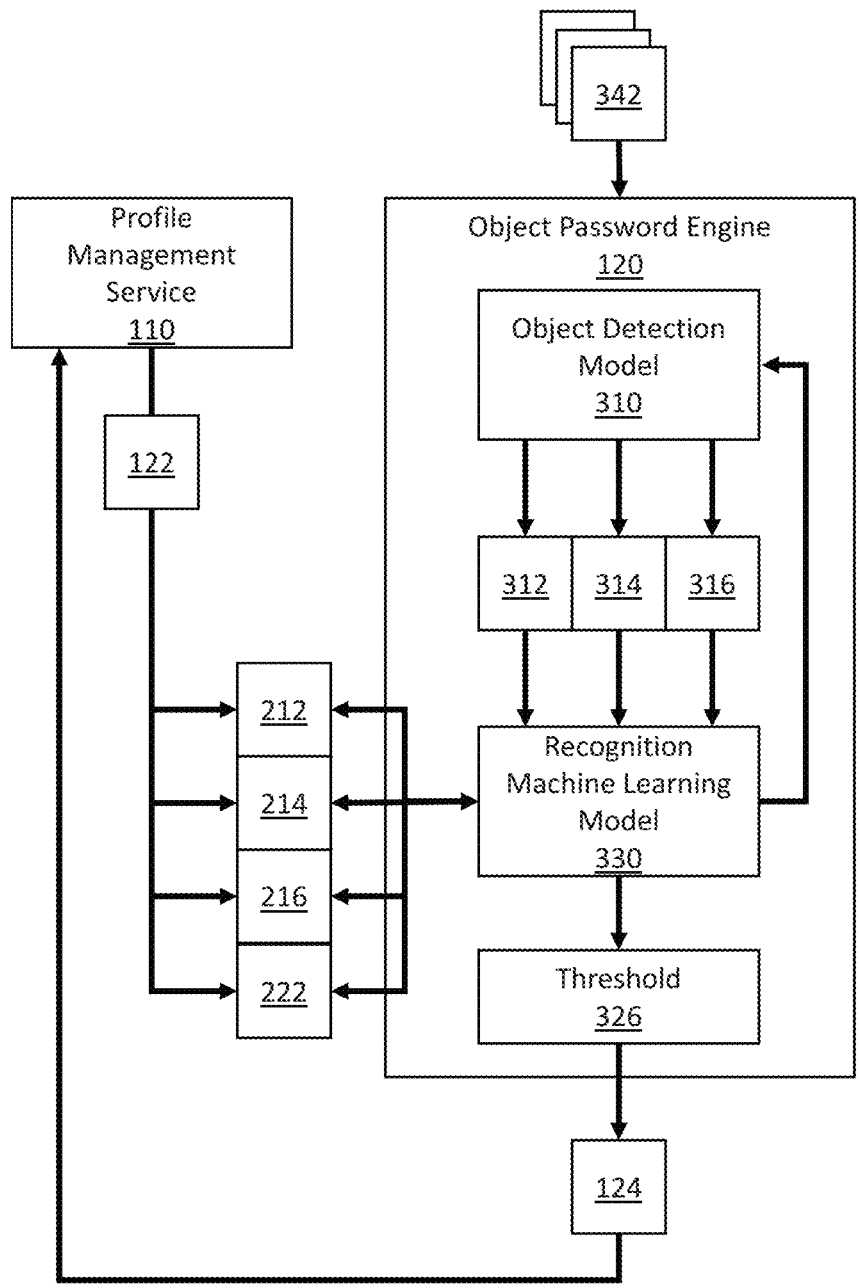

FIG. 3 is a block diagram of an exemplary object password engine of an authorization system for physical object-based authorization in accordance with one or more embodiments of the present disclosure.

In some embodiments, the profile management service 110 may control access to the user profile, e.g., for operations relative to the user profile, using a set of permissions. In some embodiments, to authorize operations for the user profile, a request may include an object password as credentials to trigger one or more permissions from the set of permissions. Upon the object password being matched to a registered object password in the user profile, the profile management service 110 may authorize the access, e.g., to perform an operation.

In some embodiments, when the user attempts to perform or authorize an operation that accesses the user profile, the user may send the request to the object password engine 120 to validation the credentials and trigger the set of permissions, thus authorizing the operation. In some embodiments, the request may include an indication of the user profile, e.g., using a user identifier and/or user profile identifier (e.g., an account number, profile ID or other suitable identifier or any combination thereof). In response, in some embodiments the user may be provided with instructions, e.g., via a computing device associated with the user using a suitable messaging technique, such as a push notification from an application, a simple message service (SMS) message, a multimedia message service (MMS) message, a rich communication service (RCS) message, an internet messaging platform, email, web browser interface element, in-app interface element, or any other suitable technique to communicate instructions on the computing device.

In some embodiments, the instructions may inform the user to provide an object password, e.g., using a suitable imaging device such as any suitable digital camera, digital video camera, webcam or other electronic image sensor or any combination thereof. As described above, in some embodiments, the object password may include one or more images 342 representing one or more object password factors, including, e.g., representations of predefined physical objects, a predefined background and/or scene, the user, a predefined arrangement of the predefined physical objects relative to position within each image, relative to the background and/or scene and/or relative to the user, and/or a predefined sequence of images. Accordingly, in some embodiments, using the imaging device, the user may produce the images 342 by capturing imagery of the predefined physical objects, a predefined background and/or scene, the user, a predefined arrangement of the predefined physical objects relative to position within each image, relative to the background and/or scene and/or relative to the user according to the predefined sequence. For example, the instructions may include an instruction to capture an image of a first predefined physical object, the first predefined background scene and the user, and then upon capturing the image, an option to capture a next image. In some embodiments, the instructions may include an instruction to capture a video and while recording sequential present the predefined physical objects according to the predefined arrangements. However, any suitable set of instructions and user interface elements may be used to instruct the user to capture one or more still images or video frames or both.

In some embodiments, the images 342 may be received, e.g., from the computing device associated with the user. The object password engine 120 uses the images 342 to detect, extract and register the image data represented therein as the object password for the user profile. Thus, in some embodiments, the user may provide images 342 that include a selected unique arrangement of physical objects in a view of the imaging device and set against a particular background scene.

In some embodiments, the images 342 can include multiple images in a sequence according to an order of capture as instructed above. For example, the images 342 may include a video feed with each successive frame of the video feed being a next image in a sequence. The images 342 may be a sequence of still images where the order of still images form the sequence. Thus, the sequence can be defined by the order of the images, or by the time of capture of each image (e.g., relative to a time of day, or relative to a timer initiated with a capture of the first image in the sequence), or any other technique for defining an order of a sequence of images or frames.

In some embodiments, the arrangement of the physical objects in the images 342 may include an order of presentation in the sequence of the images 342. The user may present multiple physical objects including portable objects, each in one or more positions, in a particular order of physical objects and arrangements thereof. Thus, the sequence of the images 342 may capture an order of physical object and arrangements or position variations. For example, a first physical object may appear in a first position in a first image, then the first physical object may appear in a second position in a subsequent image, and then a second physical object may appear in a third position in another subsequent image, and then the first physical object may appear in a fourth position in another subsequent image, where each position of the first position, the second position, the third position and the fourth position may be distinct positions within the images 342, or may include repeated positions within the images (e.g., the first position being the same as the third position).

In some embodiments, the user may identify the physical objects and associated positions as defined for use in the object password by placing the physical objects according to a predefined marker. In some embodiments, the marker for a physical object may include the user's hand such that any object that the user holds while capturing the images 342 may be included in the physical objects for the object password. In some embodiments, the marker may include a gesture performed by the user, such as the user pointing at the physical object or other suitable gesture. In some embodiments, the marker may include an identifiable marking on or adjacent to the physical objects, such as, e.g., an arrow pointing at each physical object, an "X" or other symbol positioned or formed on each physical object, a digital marker added to the images 342 after capture of the physical objects to tag each physical object of the object password (e.g., attaching a digital label, framing in a digital shape such as a box, or other digital marker), or any other suitable marker or any combination thereof.

In some embodiments, the arrangement of physical objects may be set against a background scene defined by user selection. For example, the user may perform the arrangement of physical objects against the background scene of the user's particular office space, a particular wall of a room, a particular window, or any other background scene. In some embodiments, the background scene may include any physical objects, stationary objects, colors, patterns, shapes, textures, etc. that may appear in the background scene (e.g., a landscape visible through a window, a poster or picture on a wall, a plant in the room or office space, etc.).

In some embodiments, the images 342, whether still images, video frames, or a combination thereof, are ingested by an object detection model 310 of the object password engine 120. In some embodiments, the object detection model 310 analyzes each image of the images 342 to detect the physical objects, the background scene, the user among any other objects represented in the images 342. In some embodiments, the object detection model 310 may include a first layer of object password detection including any suitable object detection framework for identifying and classifying objects. Upon detection according to the first layer, identified and classified objects may be processed according to a second layer of object password detection including determining a position within each image of each identified and classified object.

In some embodiments, the first layer of the object detection framework may employ a non-neural network based approach. In such an approach, the object detection model 310 may include a feature detection model and a classifier model where the feature detection model processes each image to form features based on variations in color, contrast, luminance, or other image data. For example, a Viola-Jones algorithm may be employed to detection, e.g., rectangle features, Haar features, or other features in each image. Other object detection frameworks, such as, e.g., scale-invariant feature transform (SIFT), histogram or oriented gradients (HOG), or other key-point based and gradient based feature detection techniques may be employed or any combination thereof. In some embodiments, upon feature detection, the object detection model 310 may employ the classifier model trained to recognize combinations of features and feature positioning/orientation to classifier objects made of up of sets of features. For example, the classifier model may include, e.g., a support vector machine, decisions trees, random forests, learning vector quantization, Naïve Bayes classifier, or other suitable classification algorithm based on the detected features.

In some embodiments, the object detection framework may employ a neural network based approach to object detection. In such an approach, the object detection model 310 may use a neural network, such as a suitable convolutional neural network architecture of object detection and/or recognition, to ingest each image and output object labels for each image identifying the object. In some embodiments, the labels may include, e.g., a descriptor identifying the object, such as, e.g., a cup, a plant, hand, etc. However, in some embodiments, the neural network may simply label each detected object according to a unique identifier, such as, e.g., object 1, object 3, etc.

In some embodiments, the neural network may include any suitable neural network architecture, such as, e.g., Region Proposals (R-CNN, Fast R-CNN, Faster R-CNN, cascade R-CNN), Single Shot MultiBox Detector (SSD), You Only Look Once (YOLO), Single-Shot Refinement Neural Network for Object Detection (RefineDet), Retina-Net, Deformable convolutional networks or any other neural network architecture or any combination thereof. In some embodiments, the neural network may be trained to detect objects based on supervised or semi-supervises training using a training dataset of annotated images. Accordingly, each image in the training dataset may be input into the neural network, and the label produced by the neural network may be compared to the annotations of the annotated images to determine an error. For example, the neural network may employ a suitable loss function to determine the error between the predicted label and the annotation of each image. For example, the loss function may include, e.g., cross entropy loss, or other suitable loss function. The error may then be backpropagated to neurons of the neural network to update the weights thereof and train the neural network to more accurately recognize objects associated with the annotations of each image in the training dataset.

Accordingly, in some embodiments, the object detection model 310 may use the object detection framework to label each object detected in the images 342. In some embodiments, the label may include an identification of the object. Thus, the representation of the physical objects in combination with the label may form an object representation 312 for each object. In some embodiments, additionally or alternatively, the object detection framework may employ an algorithm to fingerprint each object for quick and efficient comparison to representations in later images. For example, in some embodiments, the algorithm may determine one or more values to characterize relative positions, sizes, and/or shapes of portions of each detected object. In some embodiments, the one or more values may be aggregated for each physical object to form an object representation 312 including a feature vector or feature map characterizing each physical object. As a result, later images may be compared to the object representation 312 such that physical objects represented in the later images may be matched to the object representation 312 of each image 342 to authenticate an object password.

In some embodiments, the object detection model 310 may also include a facial recognition model or other suitable model for identifying a person. In some embodiments, the facial recognition model may identify within the images 342 a face or other identifying portion of the user. Using the facial recognition model, the object detection model 310 may generate a digital map for the identified face or other identifying portion. For example, in some embodiments, the facial recognition model may include, e.g., a geometric or photo-metric algorithm to represent the user's face according to relative position, size and/or shape of one or more portions of the face (e.g., the eyes, nose, ears, mouth, lips, cheekbones, chin, jaw, etc.), or other facial morphology representation or any combination thereof to form a user representation 316 representing the user in the images 342. In some embodiments, the representation of the user's face may include, e.g., a feature vector or feature map specifying the relative position, size and/or shape of one or more portions of the face, a score representing a combination of the relative position, size and/or shape of one or more portions of the face, or any combination thereof. Thus, the user's face or other identifying portion may be registered with the user's profile in the profile management service 110 to compare against authorization requests using an object password to authenticate operations relative to the user profile.

In some embodiments, using a neural network-based or non-neural network-based object detection framework, the object detection model 310 may automatically label each detected object in each image of the images 342. In some embodiments, the object detection model 310 may be trained to recognize physical objects, backgrounds, scenes, structures, faces, body parts (e.g., arms and/or hands and/or fingers) among other objects. Thus, the physical objects, including any portable objects presented by the user and any portable or stationary objects apart of the background scene may be automatically recognized and labeled by the object detection model 310.

In some embodiments, the first layer of the object detection model 310 may output, for each image of the images 342, detected object representations 312 for the detected physical objects presented by the user in each image, a detected background representation 314 for the detected background scene, and a detected user representation 316 for the detected user. In some embodiments, the detected object representations 312 may include any object representation in each image recognized by the object detection model 310, any object representation accompanies by the marker, or according to any other suitable criteria. For example, in some embodiments, the object detection model 310 may be configured to detect all physical objects in the image for which the object detection model 310 has been trained to recognize and select one or more physical objects indicated by the marker.

In some embodiments, the second layer of the object detection model 310 may determine and output a position of each detected object of each image, including the position of each of the detected object representations 312, the detected background representation 314, and the detected user representation 316 for each image. In some embodiments, the object detection model 310 may identify a position of each physical object with a given image based on, e.g., pixel measurements of distance from one or more edges (e.g., from a bottom edge, from a top edge, from a left edge, from a right edge) or combination of two more distances from two or more edges. In some embodiments, using the position within a given image, a relative position, or arrangement of each physical object may be determined based on, e.g., distance and direction between any two physical objects in the given image. However, other forms of determining and representing relative spacing and orientation of physical objects within the given image may be employ, such as distance, direction and orientation relative to fixed object, relative to the marker, relative to the user, one a pixel scale, on a percent (e.g., of distance across the image) scale, or using any other reference point and/or scale or any combination thereof.

In some embodiments, the arrangement of the physical objects, the background scene, the user and any other identified items in each image may be attached to image data representing the detected object representations 312, the detected background representation 314, and the detected user representation 316, respectively. As a result, the object detection model 310 may identify image data for each image including the physical objects, the background scene and the user and an arrangement thereof.

In some embodiments, the detected object representations 312, the detected background representation 314, and the detected user representation 316 and arrangements thereof may be provided to a recognition machine learning model 330. In some embodiments, the recognition machine learning model 330 may compare the detected object representations 312, the detected background representation 314, and the detected user representation 316 to the object representations 212, the background representation 214, and the user representation 216 registered with the profile management service 110.

In some embodiments, the profile management service 110 may provide the object password 122 registered as the credentials for the set of permissions for the user profile. In some embodiments, as described above, the object password 122 may include, e.g., the object representations 212, the background representation 214, and the user representation 216 and the sequence 222. In some embodiments, the recognition machine learning model 330 may use the sequence 222, including a presentation order of each of the object representations 212, the background representation 214, and the user representation 216 and arrangements thereof.

Accordingly, the recognition machine learning model 330 may sequentially compare each detected object representation 312, detected background representation 314, and detected user representation 316 and arrangements thereof with each object representations 212, background representation 214, and user representation 216 and arrangements thereof. Thus, a first detected object representation 312, a first detected background representation 314, and a first detected user representation 316 according to an order of the images 342 may be compared to a first object representations 212, a first background representation 214, and a first user representation 216 according to the presentation sequence 222, and then a first detected object representation 312, a first detected background representation 314, and a second detected user representation 316 according to an order of the images 342 may be compared to a second object representations 212, a second background representation 214, and a second user representation 216 according to the presentation sequence 222, and so on for as many presentations as are included in the object password 122.

In some embodiments, the recognition machine learning model 330 may compare each detected object representation 312 with each object representation 212 registered for the object password 122 to recognize each detected object representation 312 as satisfying the first object password factor. In some embodiments, to do so, the recognition machine learning model 330 may compare the features of each detected object representation 312 with each object representation 212. For example, the features may include geometric features, key-points, distances between key-points, locations of objects within an image or frame, locations of objects relative to each other, locations of objects relative to a user, location of objects relative to a background, size of each object, orientation of each object, among other features detected by the object detection model 310 and/or the object detection model 210 described above.

In some embodiments, the recognition machine learning model 330 may concatenate the features into a feature vector for each image of the images 342 to represent the detected object representations 312 of the images 342. In some embodiments, the feature vector may be ingested by the recognition machine learning model 330. In some embodiments, a machine learning model trained based on a training dataset of feature vector pairs representing image pairs labeled as matches or not matches. According to the training, the machine learning model may automatically correlate the features of the images 342 with a probability of a match to the features of the images 242. Thus, may then determine a probability of each detected object representation 312 matching each object representation 212.

In some embodiments, for example the recognition machine learning model 330 may compare at least one first object representation 212 of the at least one first image 242 and at least one second object representation 312 of at least one second image from the plurality of second images 342 having a hand of the user holding any of the plurality of second physical objects in the at least one second image to determine a probability of a match between the detected object representations 312 and the object representations 212.

In some embodiments, for example the recognition machine learning model 330 may compare at least one first object representation 212 of the at least one first image 242 and at least one second object representation 312 of at least one second image from the plurality of second images 342 having the at least one predefined arrangement of any of the plurality of second physical objects in the at least one second image to determine a probability of a match between the detected object representations 312 and the object representations 212.

In some embodiments, additionally or alternatively, a similarity between each detected object representation 312 and each object representation 212 may be assessed using a similarity model, such as, e.g., a similarity measure between the feature vector or feature map of each detected object representation 312 and the feature vector or feature map of each object representation 212. In some embodiments, the similarity measure may include, e.g., Euclidean distance, cosine similarity, Jaccard distance, Pearson correlation coefficient, or any suitable similarity measure. In some embodiments, the feature vector and/or feature map of each detected object representation 312 and each object representation 212 may include factors such as locations of objects relative to the background, location of the user relative to the background, size of objects in the background, orientation or angle of the background, geometric and/or key-point features of background, among other object characteristics represented in each detected object representation 312 and each object representation 212.

In some embodiments, the similarity measure may be used to determine whether each detected object representation 312 matches each object representation 212. In some embodiments, the similarity measure may be compared to a similarity threshold value of a threshold 326, above which a match between a particular detected object representation 312 and corresponding object representation 212 in the sequence 222 may be determined. Alternatively, or in addition, the recognition machine learning model 330 may employ a clustering model, such as a distribution model, centroid-based model (e.g., k-nearest neighbors) or other clustering model, where user representations grouped into a common cluster are deemed to match, and thus be representations of the same user.

Similarly, in some embodiments, the recognition machine learning model 330 may compare each detected background representation 314 with each background representation 214 registered for the object password 162 to recognize each detected background representation 314 as satisfying the first object password factor. In some embodiments, to do so, the recognition machine learning model 330 may compare the features of each detected background representation 314 with each background representation 214. For example, geometric features, key-points, distances between key-points, among other features detected by the object detection model 310 and/or the object detection model 210 described above, may be ingested by the recognition machine learning model 330. In some embodiments, a machine learning model trained based on a training dataset of image pairs labeled as matches or not matches may then determine a similarity of each detected background representation 314 matching each background representation 214. In some embodiments, the similarity may include, e.g., a probability value indicating a probability of a match between each detected background representation 314 and each background representation 214.

In some embodiments, additionally or alternatively, the similarity between each detected background representation 314 and each background representation 214 may be assessed using a similarity model, such as, e.g., a similarity measure between the feature vector or feature map of each detected background representation 314 and the feature vector or feature map of each background representation 214. In some embodiments, the similarity measure may include, e.g., Euclidean distance, cosine similarity, Jaccard distance, Pearson correlation coefficient, or any suitable similarity measure. In some embodiments, the feature vector and/or feature map of each detected background representation 314 and each background representation 214 may include factors such as locations of objects relative to the background, location of the user relative to the background, size of objects in the background, orientation or angle of the background, geometric and/or key-point features of background, among other object characteristics represented in each detected background representation 314 and each background representation 214.

In some embodiments, the similarity measure may be used to determine whether each detected background representation 314 matches each background representation 214. In some embodiments, the similarity measure may be compared to a similarity threshold value of the threshold 326, above which a match between a particular detected background representation 314 and corresponding background representation 214 in the sequence 222 may be determined. Alternatively, or in addition, the recognition machine learning model 330 may employ a clustering model, such as a distribution model, centroid-based model (e.g., k-nearest neighbors) or other clustering model, where user representations grouped into a common cluster are deemed to match, and thus be representations of the same user.

Similarly, in some embodiments, the recognition machine learning model 330 may compare each detected user representation 316 with each user representation 216 registered for the object password 162 to recognize each detected user representation 316 as satisfying the first object password factor. In some embodiments, to do so, the recognition machine learning model 330 may compare the features of each detected user representation 316 with each user representation 216. For example, geometric features, key-points, distances between key-points, among other features detected by the object detection model 310 and/or the object detection model 210 described above, may be ingested by the recognition machine learning model 330. In some embodiments, a machine learning model trained based on a training dataset of image pairs labeled as matches or not matches may then determine a similarity of each detected user representation 316 matching each user representation 216. In some embodiments, the similarity may include, e.g., a probability value indicating a probability of a match between each detected user representation 316 and each user representation 216 to recognize the user as a permissioned user for performing operations for the user profile, or to not recognize the user and determine that the user a non-permission violator user. For example, where the probability of a match based on the similarity exceeds a threshold, the user may be recognized as a permissioned user, but when the probability falls below the threshold the user may not be recognized as a permissioned user, and thus may be considered a non-permissioned violator user.

In some embodiments, additionally or alternatively, the similarity between each detected user representation 316 and each user representation 216 may be assessed using a similarity model, such as, e.g., a similarity measure between the feature vector or feature map of each detected user representation 316 and the feature vector or feature map of each user representation 216. In some embodiments, the similarity measure may include, e.g., Euclidean distance, cosine similarity, Jaccard distance, Pearson correlation coefficient, or any suitable similarity measure. In some embodiments, the feature vector and/or feature map of each detected user representation 316 and each user representation 216 may include factors such as locations of the user within an image or frame, locations of objects relative to the user, location of the user relative to a background, size of the user, orientation or angle of the user, geometric and/or key-point features of user, among other object characteristics represented in each detected user representation 316 and each user representation 216 to recognize the user as a permissioned user for performing operations for the user profile, or to not recognize the user and determine that the user a non-permission violator user.

In some embodiments, the similarity measure may be used to determine whether each detected user representation 316 matches each user representation 216. In some embodiments, the similarity measure may be compared to a similarity threshold value of the threshold 326, above which a match between a particular detected user representation 316 and corresponding user representation 216 in the sequence 222 may be determined to recognize the user as a permissioned user for performing operations for the user profile, or to not recognize the user and determine that the user a non-permission violator user. Alternatively, or in addition, the recognition machine learning model 330 may employ a clustering model, such as a distribution model, centroid-based model (e.g., k-nearest neighbors) or other clustering model, where user representations grouped into a common cluster are deemed to match, and thus be representations of the same user.

In some embodiments, each of the detected object representations 312, the detected background representation 314 and the detected user representation 316 may be compared to the object representation 212, the background representation 214 and the user representation 216 registered as the object password 122. In some embodiments, the detected object representations 312, the detected background representation 314 and the detected user representation 316 are each separately compared to the object representation 212, the background representation 214 and the user representation 216 registered as the object password 122. The similarity measure for each of the detected object representations 312, the detected background representation 314 and the detected user representation 316 may be determined and then aggregated to determine an overall probability that the user is a permissioned user to perform the at least one operation, or that the user is a non-permissioned violator user based on a threshold 326. For example, the similarity measures may be aggregated with, e.g., a sum, a weighted sum, an average, a weighted average, or other suitable aggregation method or any combination thereof and compared against the threshold 326.

In some embodiments, rather than determining the similarity measure of each of the detected object representations 312, the detected background representation 314 and the detected user representation 316 separately, the recognition machine learning model 330 may concatenate the feature vectors for each the detected object representations 312, the detected background representation 314 and the detected user representation 316 for a particular image of the images 342 to form an image feature vector representing the particular image. This image feature vector may be compared to an object password image feature vector representing a concatenation of the features vectors for the object representation 212, the background representation 214 and the user representation 216 of a particular image of the object password 122. As a result, the recognition machine learning model 330 may determine a similarity between the image feature vector and the object password image feature vector for each image.

In some embodiments, where the similarity between the image feature vector and the object password image feature vector for each image exceeds the similarity value threshold of the threshold 326, where the similarity measure for each of the detected object representations 312, the detected background representation 314 and the detected user representation 316 all separately all exceed the similarity value threshold of the threshold 326, and/or where any suitable combination or aggregation of similarity measures of the image feature vector and/or each of the detected object representations 312, the detected background representation 314 and the detected user representation 316 exceed the similarity value threshold of the threshold 326, the images 342 may provide a probability that the user is a permissioned user to perform the at least one operation.

In some embodiments, to ensure that the images 342 are authentic object password inputs, the recognition machine learning model 330 may also compare each similarity measure to a variation requirement threshold value to assess a degree of variation between the images 342 and the images 242. Where the degree of variation is above the variation requirement threshold value (e.g., above an upper limit for the similarity measure), the recognition machine learning model 330 may determine that the images 342 do not represent actual live images of the user presenting the object password. Thus, the recognition machine learning model 330 may detect counterfeit attempts at providing the object password, such as reproduced images of the original images 242.

However, where the degree of variation is above a match threshold, the recognition machine learning model 330 may determine that the user of the detected user representation 316 is not the same user as the user of the user representation 216. In some embodiments, to detect variation, the recognition machine learning model 330 may quantify and compare features of the detected user representation 316 and the user representation 216 including, e.g., the object representations 212 and detected object representations 312, and/or a characterization of positioning and orientation, angle, lighting, wear other features of the user and/or physical objects of the images 342.

In some embodiments, similarity may be assessed for each image in the images 342. Accordingly, the recognition machine learning model 330 may compare each successive image of the images 342 to a next image in the sequence 222 in order to compare the ordered object representations 212, background representations 214 and user representations 216 of the object password. Thus, where the detected object representations 312, the detected background representations 314 and the detected user representations 316 are detected in the images 342 in an order matching the sequence 222, all factors of the object password may be satisfied to, e.g., authenticate access or permission to perform an operation, such as a financial transaction or other electronic operation.

As a result, in some embodiments, the object password engine 120 may produce an authentication 124 include a tag for the user based on the matching of the physical objects, background, user and sequence thereof in the images 342 to the object password 122 for the user profile. In some embodiments, where the probability of a match for each or all of the physical objects, background, user and sequence thereof exceeds the threshold 326, the authentication 124 may include a tag of a permissioned user for an access approval. In some embodiments, the access approval may control the profile management service 110 to, e.g., enable user verification for an operation (e.g., a transaction or other operation), enable user access to the user profile or an associated account, enable access to a physical space linked to the user profile, or for any other suitable operation controlled according to the set of permissions for the user profile. In some embodiments, where the probability of a match for one or more of, or all of the physical objects, background, user and sequence thereof falls below the threshold 326, the authentication 124 may include a tag of a non-permissioned violator user accompanying an access denial. In some embodiments, the access denial may control the profile management service 110 to, e.g., disable user verification for an operation (e.g., a transaction or other operation), disable user access to the user profile or an associated account, disable access to a physical space linked to the user profile, or disable any other suitable operation controlled according to the set of permissions for the user profile.

Figure 4:
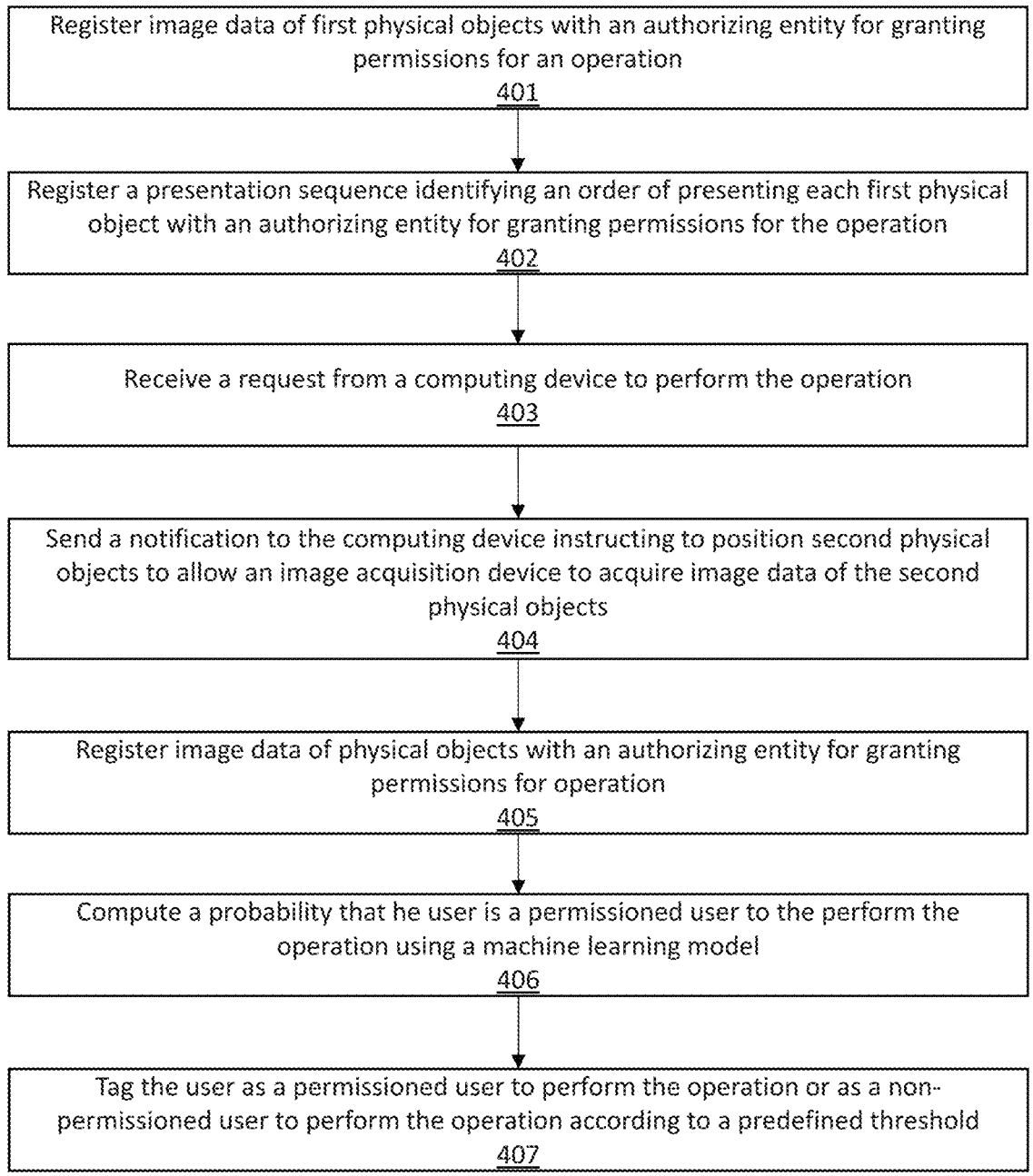

FIG. 4 illustrates a flowchart of an illustrative methodology for physical object-based authorization in accordance with one or more embodiments of the present disclosure.

In some embodiments, block 401 includes a step to register image data of first physical objects with an authorizing entity for granting permissions for an operation. In some embodiments, registering the image data may include, e.g., submitting a sequence of images representing the first physical objects according to a sequence and arrangement of the first physical objects.

In some embodiments, block 402 includes a step to register a presentation sequence identifying an order of presenting each first physical object with an authorizing entity for granting permissions for the operation. In some embodiments, the presentation sequence may be defined according to an order of the images represented by the image data to form an order of presentation of the first physical objects and an order of arrangements of each first physical object.

In some embodiments, block 403 includes a step to receive a request from a computing device to perform the operation. In some embodiments, an initiator or other computing device may be employed to attempt an operation with access to a user profile. The computing device may send the request specifying the operation and the user profile.

In some embodiments, block 404 includes a step to send a notification to the computing device instructing to position second physical objects to allow an image acquisition device to acquire image data of the second physical objects. In some embodiments, in response to the request, a user may provide an object password to satisfying permissions to allow the operation to access the user profile. Thus, the notification may instruct the user to provide the object password using the second physical objects and the image acquisition device.

In some embodiments, block 405 includes a step to register image data of physical objects with an authorizing entity for granting permissions for operation. In some embodiments, the image data from the image acquisition device may be analyzed to detect and recognize the second physical objects, as well as other features of the image data, such as a representation of the user and/or a background scene.

In some embodiments, block 406 includes a step to compute a probability that the user is a permissioned user to the perform the operation using a machine learning model. In some embodiments, the second physical objects, based on the detection and recognition thereof, may be compared to the first physical objects registered with the authorizing entity for granting permissions for the operation. In some embodiments, a machine learning model, clustering model, similarity measure, or any combination thereof may be employed to assess similarity and produce a probability of a match.

In some embodiments, block 407 includes a step to tag the user as a permissioned user to perform the operation or as a non-permissioned user to perform the operation according to a predefined threshold. In some embodiments, the probability of the match may be compared to the predefined threshold. If the probability exceeds the threshold, then the user may be tagged as a permissioned user and access may be granted according to the permissions to allow the operation to be performed. If the probability does not exceed the threshold, then the user may be tagged as a non-permissioned violator user and access may be denied according to the permissions to prevent the operation from being performed.

Figure 5:
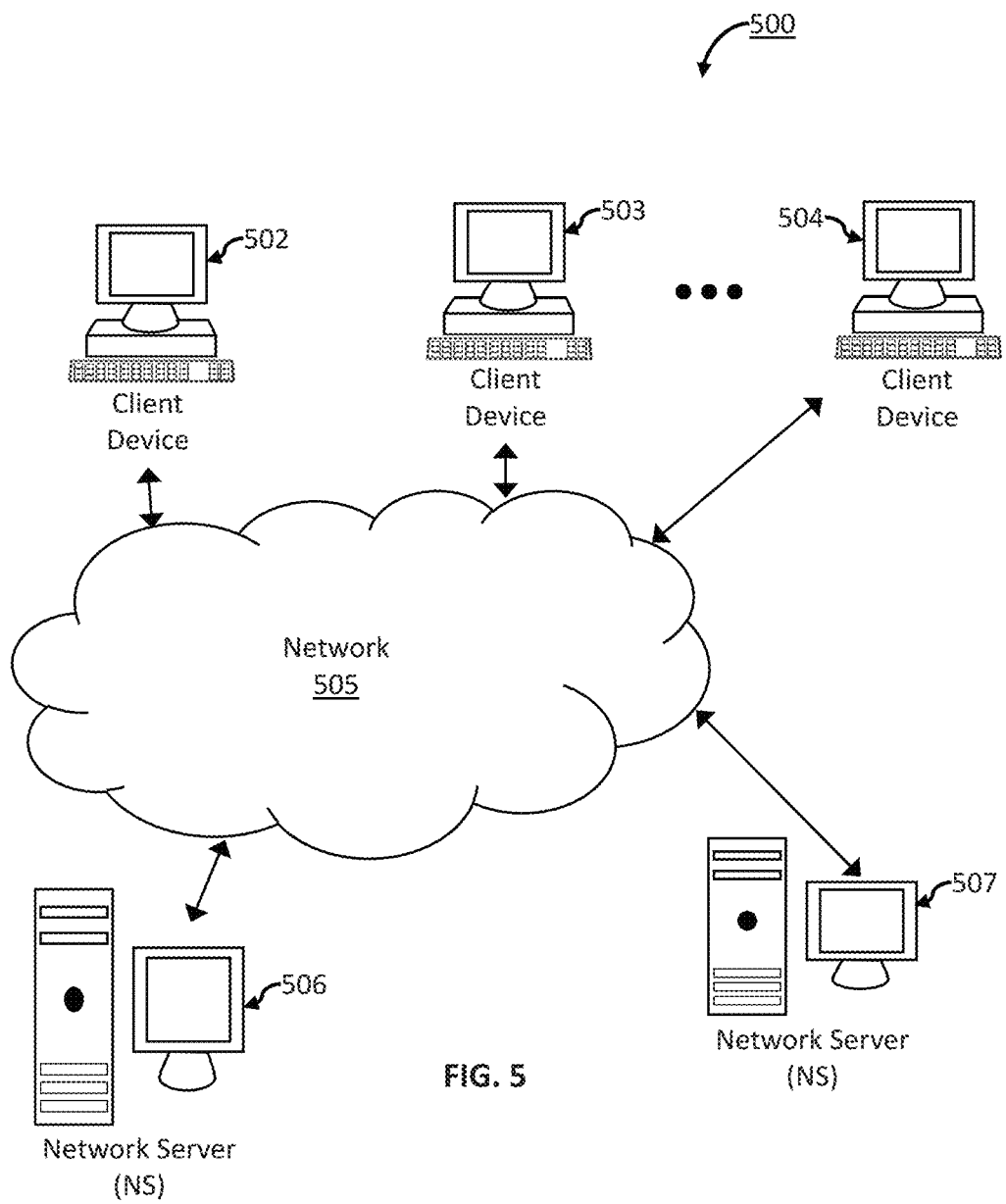

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, member computing device 502, member computing device 503 through member computing device 504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ and/or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
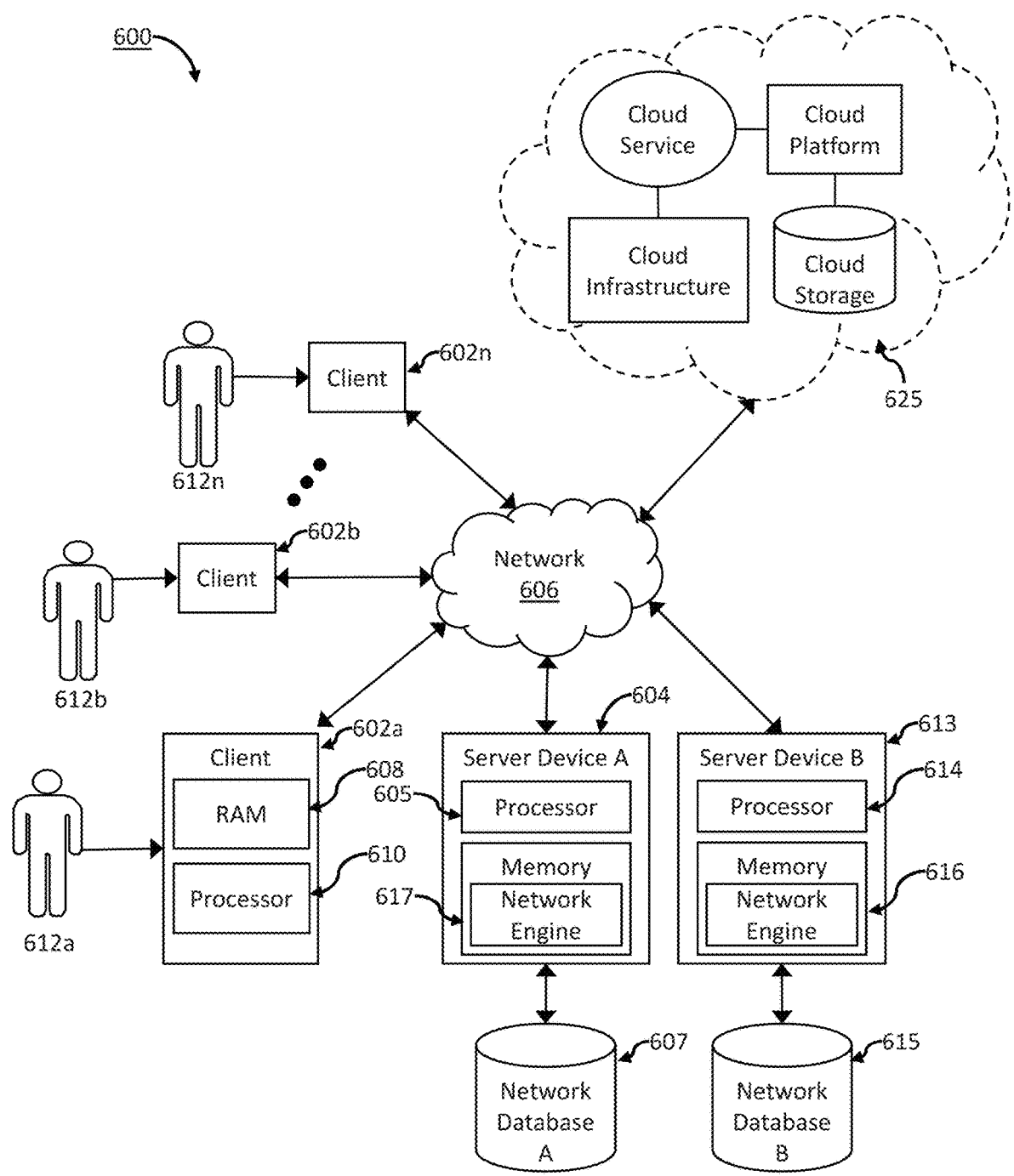

FIG. 6 depicts a block diagram of another exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 602a, member computing device 602b through member computing device 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of non-transitory computer-readable memory/media may include, but are not limited to, an electronic, optical, magnetic, or other storage or transmission device capable of providing a processor, such as the processor 610 of client 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602a through 602n may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, user 612a, user 612b through user 612n, may communicate over the exemplary network 606 with each other and/or with other systems and/or devices coupled to the network 606. As shown in FIG. 6, exemplary server devices 604 and 613 may include processor 605 and processor 614, respectively, as well as memory 617 and memory 616, respectively. In some embodiments, the server devices 604 and 613 may be also coupled to the network 606. In some embodiments, one or more member computing devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
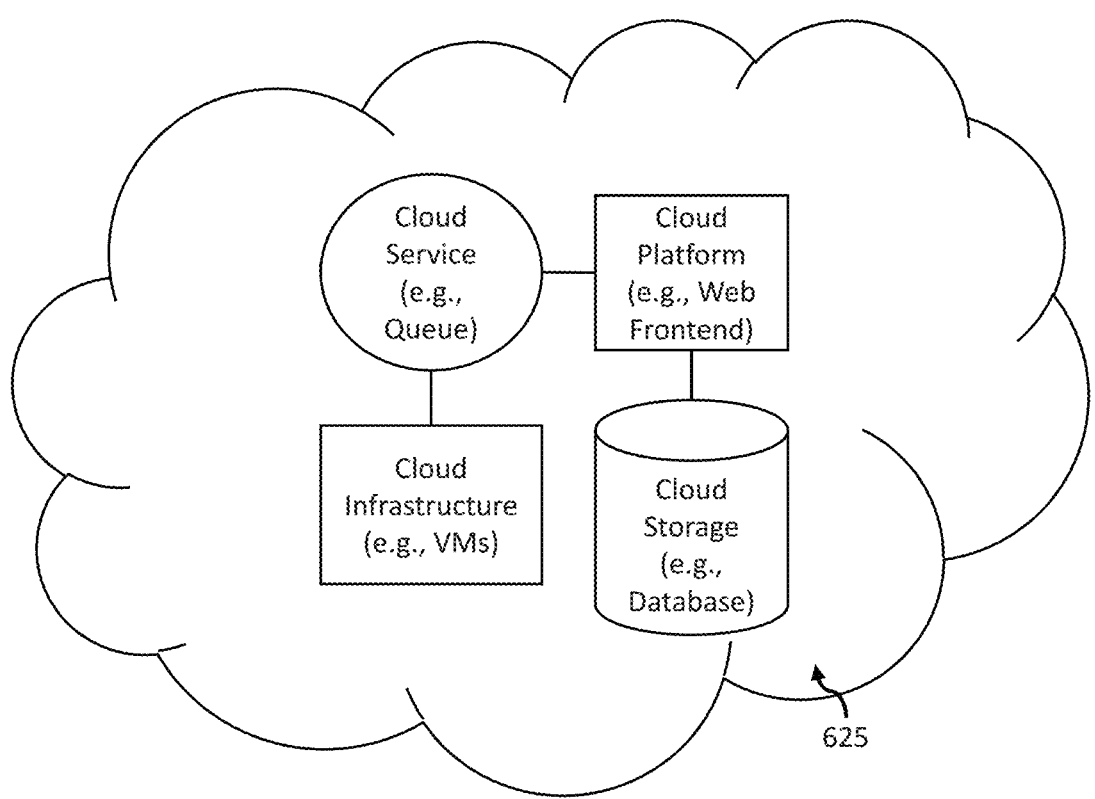
Figure 8:
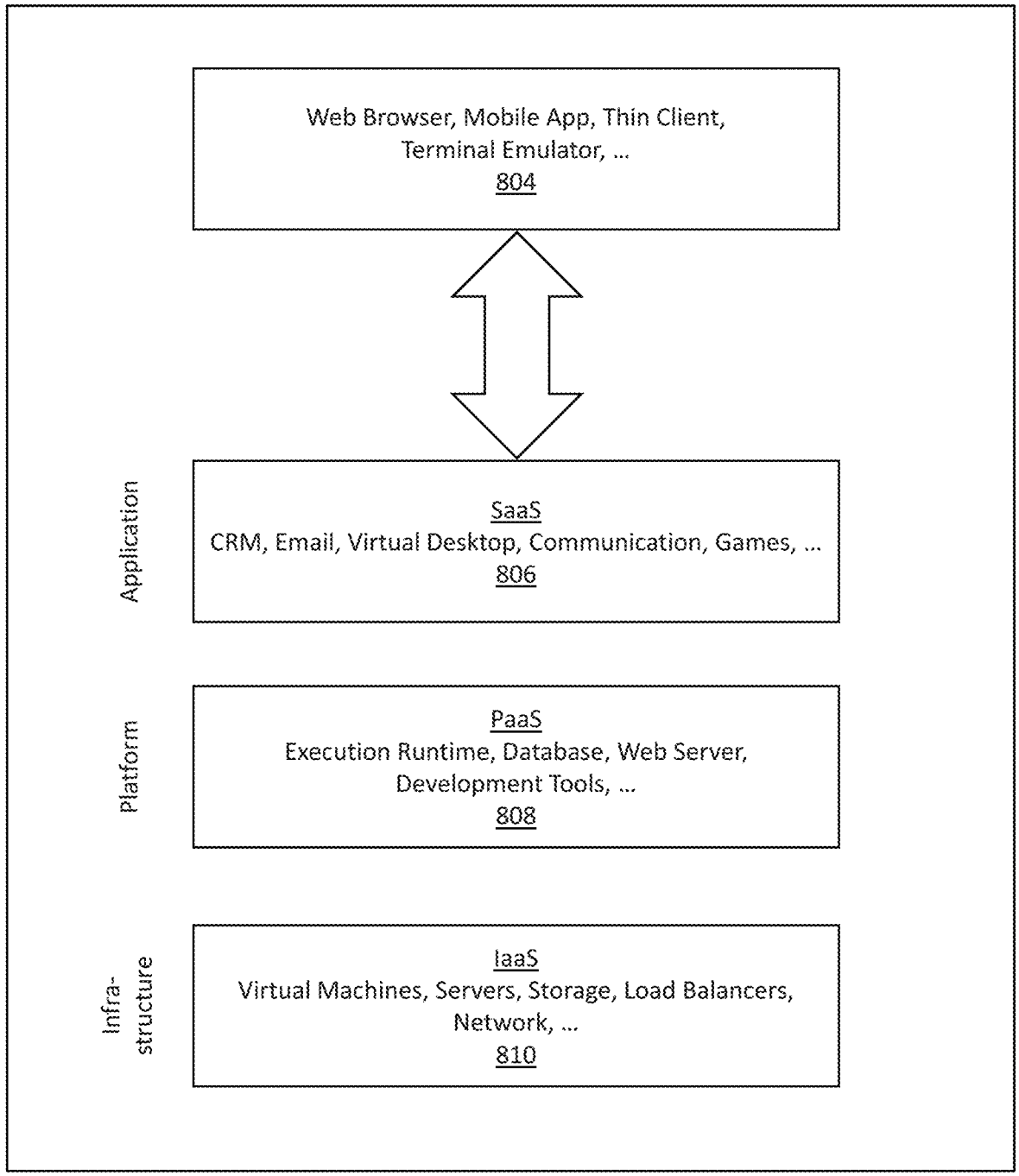

In some embodiments, the exemplary inventive computer-based systems/platforms, the exemplary inventive computer-based devices, and/or the exemplary inventive computer-based components of the present disclosure may be specifically configured to operate in a cloud computing/architecture 625 such as, but not limiting to: infrastructure a service (IaaS) 810, platform as a service (PaaS) 808, and/or software as a service (SaaS) 806 using a web browser, mobile app, thin client, terminal emulator or other endpoint 804. FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method, comprising:
  registering, by a processor of a server associated with an authorizing entity, first image data of a plurality of first images of a plurality of first physical objects to be used for granting permission to a user to perform at least one operation on the server;
  detecting, by the processor, in the first image data:
    (i) a plurality of first object representations of the plurality of first physical objects, and
    (ii) a plurality of first background scene representations of a plurality of first background scenes associated with the plurality of first physical objects;
  registering, by the processor, a first presentation sequence identifying a first order for presenting each of the plurality of first physical objects for granting the permission to the user to perform the at least one operation on the server;
  storing, by the processor, in a non-transitory memory:
    the plurality of first object representations,
    the plurality of first background scene representations, and
    the first presentation sequence;
  receiving, by the processor, over a communication network, a request from the user through a computing device associated with the user to perform the at least one operation;
    wherein the computing device comprises an image acquisition device;
  sending, by the processor, in response to the request, a notification to the computing device instructing the user to position a plurality of second physical objects so as to allow the image acquisition device to acquire second image data of a plurality of second images of the plurality of second physical objects;
  receiving, by the processor, over the communication network, the second image data and a second presentation sequence that is a second order in which the user has presented each of the plurality of second physical objects to the image acquisition device;
  detecting, by the processor, in the second image data:
    (i) a plurality of second object representations of the plurality of second physical objects, and
    (ii) a plurality of second background scene representations of a plurality of second background scenes associated with the plurality of second physical objects;
  computing, by the processor, a probability that the user is a permissioned user that is permissioned to perform the at least one operation by inputting the first image data and the second image data into at least one machine learning model;
    wherein the at least one machine learning model is configured to compute the probability based at least in part on:
      a first comparison between the plurality of first object representations and the plurality of second object representations,
      a second comparison between the plurality of first background scene representations and the plurality of second background scene representations, and
      a third comparison between the first presentation sequence and the second presentation sequence; and
  tagging, by the processor, the user as:
    the permissioned user to perform the at least one operation when the probability is above a predefined threshold, or
    a non-permissioned violator user when the probability is below the predefined threshold.

Clause 2. A server, comprising:
  a non-transitory memory; and
  at least one processor associated with an authorizing entity configured to execute computer code stored in the non-transitory memory that causes the at least one processor to:
    register first image data of a plurality of first images of a plurality of first physical objects to be used for granting permission to a user to perform at least one operation on the server;
    detect in the first image data:
      (i) a plurality of first object representations of the plurality of first physical objects, and
      (ii) a plurality of first background scene representations of a plurality of first background scenes associated with the plurality of first physical objects;
    register a first presentation sequence identifying a first order for presenting each of the plurality of first physical objects for granting the permission to the user to perform the at least one operation on the server;
    store in the non-transitory memory:
      the plurality of first object representations,
      the plurality of first background scene representations, and
      the first presentation sequence;
    receive over a communication network, a request from the user through a computing device associated with the user to perform the at least one operation;
      wherein the computing device comprises an image acquisition device;
    send in response to the request, a notification to the computing device instructing the user to position a plurality of second physical objects so as to allow the image acquisition device to acquire second image data of a plurality of second images of the plurality of second physical objects;
    receive over the communication network, the second image data and a second presentation sequence that is a second order in which the user has presented each of the plurality of second physical objects to the image acquisition device;
    detect in the second image data:
      (i) a plurality of second object representations of the plurality of second physical objects, and
      (ii) a plurality of second background scene representations of a plurality of second background scenes associated with the plurality of second physical objects;

compute a probability that the user is a permissioned user that is permissioned to perform the at least one operation by inputting the first image data and the second image data into at least one machine learning model;
  wherein the at least one machine learning model is configured to compute the probability based at least in part on:
    a first comparison between the plurality of first object representations and the plurality of second object representations,
    a second comparison between the plurality of first background scene representations and the plurality of second background scene representations, and
    a third comparison between the first presentation sequence and the second presentation sequence; and
  tag the user as:
    the permissioned user to perform the at least one operation when the probability is above a predefined threshold, or
    a non-permissioned violator user when the probability is below the predefined threshold.

Clause 3. The systems and methods of clauses 1 and/or 2, wherein the first image data of the plurality of first physical objects comprises at least one picture of each of the plurality of first physical objects, at least one video of each of the plurality of first physical objects, or any combination thereof.

Clause 4. The systems and methods of clauses 1 and/or 2, wherein the second image data of the plurality of second physical objects comprises at least one picture of each of the plurality of second physical objects, at least one video of each of the plurality of second physical objects, or any combination thereof.

Clause 5. The systems and methods of clauses 1 and/or 2, wherein the registering of the first image data comprises registering first image data from the plurality of first images taken at different angles for each of the plurality of first physical objects.

Clause 6. The systems and methods of clauses 1 and/or 2, wherein the receiving of the second image data of the plurality of second images comprises receiving second image data of images from the plurality of second images having any combination of each of the plurality of second physical objects.

Clause 7. The systems and methods of clauses 1 and/or 2, wherein the detecting in the first image data comprises detecting in the first image data at least one first image having at least one predefined arrangement of any of the plurality of first physical objects in the at least one first image; and
  wherein the computing of the probability is based on a comparison between at least one first object representation of the at least one first image and at least one second object representation of at least one second image from the plurality of second images having the at least one predefined arrangement of any of the plurality of second physical objects in the at least one second image.

Clause 8. The systems and methods of clauses 1 and/or 2, wherein the detecting in the first image data comprises detecting in the first image data at least one first image having a hand of the user holding any of the plurality of first physical objects in the at least one first image; and
  wherein the computing of the probability is based on a comparison between at least one first object representation of the at least one first image and at least one second object representation of at least one second image from the plurality of second images having the hand of the user holding any of the plurality of second physical objects in the at least one second image.

Clause 9. The systems and methods of clauses 1 and/or 2, wherein the at least one machine learning model is an image classification machine learning model.

Clause 10. The systems and methods of clauses 1 and/or 2, wherein the authorizing entity is a financial institution.

Clause 11. The systems and methods of clauses 1 and/or 2, wherein the at least one operation is a financial transaction.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method, comprising:
  registering, by a processor of a server associated with an authorizing entity, first image data of a plurality of first images of a plurality of first physical objects to be used for granting permission to a user to perform at least one operation on the server;
  detecting, by the processor, in the first image data:
    (i) a plurality of first object representations of the plurality of first physical objects, and
    (ii) a plurality of first background scene representations of a plurality of first background scenes associated with the plurality of first physical objects;
  registering, by the processor, a first presentation sequence identifying a first order for presenting each of the plurality of first physical objects for granting the permission to the user to perform the at least one operation on the server;
  storing, by the processor, in a non-transitory memory:
    the plurality of first object representations,
    the plurality of first background scene representations, and
    the first presentation sequence;
  receiving, by the processor, over a communication network, a request from the user through a computing device associated with the user to perform the at least one operation;
    wherein the computing device comprises an image acquisition device;
  sending, by the processor, in response to the request, a notification to the computing device instructing the user to position a plurality of second physical objects so as to allow the image acquisition device to acquire second image data of a plurality of second images of the plurality of second physical objects;
  receiving, by the processor, over the communication network, the second image data and a second presentation sequence that is a second order in which the user has presented each of the plurality of second physical objects to the image acquisition device;

detecting, by the processor, in the second image data:
(i) a plurality of second object representations of the plurality of second physical objects, and
(ii) a plurality of second background scene representations of a plurality of second background scenes associated with the plurality of second physical objects;

computing, by the processor, a probability that the user is a permissioned user that is permissioned to perform the at least one operation by inputting the first image data and the second image data into at least one machine learning model;

wherein the at least one machine learning model is configured to compute the probability based at least in part on:
a first comparison between the plurality of first object representations and the plurality of second object representations,
a second comparison between the plurality of first background scene representations and the plurality of second background scene representations, and
a third comparison between the first presentation sequence and the second presentation sequence; and tagging, by the processor, the user as:
the permissioned user to perform the at least one operation when the probability is above a predefined threshold, or
a non-permissioned violator user when the probability is below the predefined threshold.

2. The method according to claim 1, wherein the first image data of the plurality of first physical objects comprises at least one picture of each of the plurality of first physical objects, at least one video of each of the plurality of first physical objects, or any combination thereof.

3. The method according to claim 1, wherein the second image data of the plurality of second physical objects comprises at least one picture of each of the plurality of second physical objects, at least one video of each of the plurality of second physical objects, or any combination thereof.

4. The method according to claim 1, wherein the registering of the first image data comprises registering first image data from the plurality of first images taken at different angles for each of the plurality of first physical objects.

5. The method according to claim 1, wherein the receiving of the second image data of the plurality of second images comprises receiving second image data of images from the plurality of second images having any combination of each of the plurality of second physical objects.

6. The method according to claim 1, wherein the detecting in the first image data comprises detecting in the first image data at least one first image having at least one predefined arrangement of any of the plurality of first physical objects in the at least one first image; and wherein the computing of the probability is based on a comparison between at least one first object representation of the at least one first image and at least one second object representation of at least one second image from the plurality of second images having the at least one predefined arrangement of any of the plurality of second physical objects in the at least one second image.

7. The method according to claim 1, wherein the detecting in the first image data comprises detecting in the first image data at least one first image having a hand of the user holding any of the plurality of first physical objects in the at least one first image; and wherein the computing of the probability is based on a comparison between at least one first object representation of the at least one first image and at least one second object representation of at least one second image from the plurality of second images having the hand of the user holding any of the plurality of second physical objects in the at least one second image.

8. The method according to claim 1, wherein the at least one machine learning model is an image classification machine learning model.

9. The method according to claim 1, wherein the authorizing entity is a financial institution.

10. The method according to claim 1, wherein the at least one operation is a financial transaction.

11. A server, comprising:
a non-transitory memory; and
at least one processor associated with an authorizing entity configured to execute computer code stored in the non-transitory memory that causes the at least one processor to:
register first image data of a plurality of first images of a plurality of first physical objects to be used for granting permission to a user to perform at least one operation on the server;
detect in the first image data:
(i) a plurality of first object representations of the plurality of first physical objects, and
(ii) a plurality of first background scene representations of a plurality of first background scenes associated with the plurality of first physical objects;
register a first presentation sequence identifying a first order for presenting each of the plurality of first physical objects for granting the permission to the user to perform the at least one operation on the server;
store in the non-transitory memory:
the plurality of first object representations,
the plurality of first background scene representations, and
the first presentation sequence;
receive over a communication network, a request from the user through a computing device associated with the user to perform the at least one operation;
wherein the computing device comprises an image acquisition device;
send in response to the request, a notification to the computing device instructing the user to position a plurality of second physical objects so as to allow the image acquisition device to acquire second image data of a plurality of second images of the plurality of second physical objects;
receive over the communication network, the second image data and a second presentation sequence that is a second order in which the user has presented each of the plurality of second physical objects to the image acquisition device;
detect in the second image data:

(i) a plurality of second object representations of the plurality of second physical objects, and
(ii) a plurality of second background scene representations of a plurality of second background scenes associated with the plurality of second physical objects;

compute a probability that the user is a permissioned user that is permissioned to perform the at least one operation by inputting the first image data and the second image data into at least one machine learning model;

wherein the at least one machine learning model is configured to compute the probability based at least in part on:
a first comparison between the plurality of first object representations and the plurality of second object representations,
a second comparison between the plurality of first background scene representations and the plurality of second background scene representations, and
a third comparison between the first presentation sequence and the second presentation sequence; and tag the user as:
the permissioned user to perform the at least one operation when the probability is above a predefined threshold, or
a non-permissioned violator user when the probability is below the predefined threshold.

12. The server according to claim 11, wherein the first image data of the plurality of first physical objects comprises at least one picture of each of the plurality of first physical objects, at least one video of each of the plurality of first physical objects, or any combination thereof.

13. The server according to claim 12, wherein the second image data of the plurality of second physical objects comprises at least one picture of each of the plurality of second physical objects, at least one video of each of the plurality of second physical objects, or any combination thereof.

14. The server according to claim 11, wherein the at least one processor is configured to register the first image data by registering first image data from the plurality of first images taken at different angles for each of the plurality of first physical objects.

15. The server according to claim 11, wherein the at least one processor is configured to receive the second image data of the plurality of second images by receiving second image data of images from the plurality of second images having any combination of each of the plurality of second physical objects.

16. The server according to claim 15, wherein the at least one processor is configured to:
detect in the first image data at least one first image having at least one predefined arrangement of any of the plurality of first physical objects in the at least one first image; and
compute the probability based on a comparison between at least one first object representation of the at least one first image and at least one second object representation of at least one second image from the plurality of second images having the at least one predefined arrangement of any of the plurality of second physical objects in the at least one second image.

17. The server according to claim 11, wherein the at least one processor is configured to:
detect in the first image data at least one first image having a hand of the user holding any of the plurality of first physical objects in the at least one first image; and
compute the probability based on a comparison between at least one first object representation of the at least one first image and at least one second object representation of at least one second image from the plurality of second images having the hand of the user holding any of the plurality of second physical objects in the at least one second image.

18. The server according to claim 11, wherein the at least one machine learning model is an image classification machine learning model.

19. The server according to claim 11, wherein the authorizing entity is a financial institution.

20. The server according to claim 11, wherein the at least one operation is a financial transaction.

* * * * *